(12) United States Patent
Snell

(10) Patent No.: US 8,757,108 B2
(45) Date of Patent: Jun. 24, 2014

(54) HIGH EFFICIENCY ENGINE FOR ULTRA-HIGH ALTITUDE FLIGHT

(75) Inventor: William Snell, Monmouth, OR (US)

(73) Assignee: William Snell, Monmouth, OR (US)

( * ) Notice: Subject to any disclaimer, the term of this patent is extended or adjusted under 35 U.S.C. 154(b) by 0 days.

(21) Appl. No.: 13/300,550

(22) Filed: Nov. 19, 2011

(65) Prior Publication Data

US 2013/0055984 A1 Mar. 7, 2013

Related U.S. Application Data

(60) Provisional application No. 61/532,062, filed on Sep. 7, 2011.

(51) Int. Cl.
*F02B 47/02* (2006.01)

(52) U.S. Cl.
USPC ........................................ 123/25 R; 123/56.1

(58) Field of Classification Search
USPC ................... 123/25 R, 51 R, 51 A, 51 B, 56.1
See application file for complete search history.

(56) References Cited

U.S. PATENT DOCUMENTS

| 4,312,305 | A | * | 1/1982 | Noguchi et al. | 123/51 BA |
|---|---|---|---|---|---|
| 4,543,916 | A | * | 10/1985 | Giorno | 123/48 AA |
| 5,934,228 | A | * | 8/1999 | Wheat | 123/48 C |
| 6,199,519 | B1 | * | 3/2001 | Van Blarigan | 123/46 R |
| 2008/0223332 | A1 | * | 9/2008 | Maro et al. | 123/25 R |
| 2010/0147269 | A1 | * | 6/2010 | Flowers et al. | 123/51 R |
| 2010/0187237 | A1 | * | 7/2010 | Brooks et al. | 220/560.04 |

* cited by examiner

*Primary Examiner* — Lindsay Low
*Assistant Examiner* — Omar Morales
(74) *Attorney, Agent, or Firm* — Patent Ingenius LLC; Scott Evan Gilbert

(57) ABSTRACT

A high thermal efficiency reciprocating hydrogen-fueled engine for ultra-high altitude long endurance flight and its method of operation are described. The engine is based on an opposed piston barrel design where long cylinders are employed to accommodate extraordinarily large compression and expansion strokes where the corresponding ratios are over 50:1, taking advantage of the very low ambient air pressures and temperatures at 60,000 ft and higher to reduce the overall weight and strength requirements of the inventive engine that would be a factor for operation at lower altitudes. The engine is designed to obtain more than 70% indicated thermal efficiency when operated at ultra-high altitudes of 60,000 ft and greater. A combination of large compression ratios combustion temperature optimization and management, instantaneous and complete combustion at TDC, followed by a rapid and long expansion stroke using tailored control of piston movement provide the means to achieve such high efficiencies.

6 Claims, 10 Drawing Sheets

HIGH EFFICIENCY ENGINE FOR ULTRA-HIGH ALTITUDE FLIGHT

PRIORITY CLAIM

This application claims priority to U.S. Provisional Patent Application No. 61/532,062 filed Sep. 7, 2011.

FIELD OF THE INVENTION

The invention relates to highly efficient engines for propeller-driven ultra-high altitude and stratospheric fixed-wing flight.

BACKGROUND OF THE INVENTION

Improvements in jet engine technology over the last half-century have steadily led to a 55% increase in engine fuel efficiency per seat-kilometer since the introduction in the late 1950s of the Boeing 707 aircraft. With the advent of the high bypass turbofan engine, now ubiquitous in civil jet aviation, the fuel consumption per seat-kilometer is about equal to that of early commercial piston-prop airliner engines (data from National Aerospace Laboratory (The Netherlands) report NLR-CR-2005-669). Nevertheless, the low thermal efficiency of these engines (30%-40%) is not sufficient to compensate the rising cost of jet fuel. Low fuel efficiencies require commercial airliners to carry large amounts of fuel on board. A metric that can be used for comparison of overall fuel efficiency is the fuel to payload weight ratio. For example, a Boeing 747-400F requires 266,000 lbs of fuel to carry a payload of 250,000 lbs over a distance of 4,445 nautical miles.

The innovations in jet engine technology that have lead to improvements in fuel efficiency have been historically spurred by spurts in fuel prices, which have negative effects on demand and growth of the industry as airfares are forced to sharply increase. As oil prices had remained steady during the 1980s and 1990s while demand for air travel rose, there was little incentive to make improvements in engine efficiency. Since then, only incremental improvements in engine efficiency have been realized, only coming along after years of pain already experienced by the industry. During the past decade, fuel prices have risen sharply and the trend continues steadily upward. Fuel prices currently account for over half the operating expenses of any airline. The Boeing 787 dreamliner and the Airbus A350 are the industry's most recent answers to rising fuel prices only to be introduced recently, claiming respectively 15% and 25% incremental improvements in fuel efficiency, mostly due to the use of light weight carbon fiber composite structural materials to build the airframe as opposed to fundamental improvements in engine fuel efficiency. Despite these efforts, continually rising oil prices in a volatile and disappearing market will soon outrun any economic gains realized today, demanding again new technologies that will lag the pain in the airline industry as permanent solutions to the petroleum-based fuel crisis are not being proactively sought out.

As a viable alternative to hydrocarbon fuels, hydrogen as a fuel for aviation and ground transport fundamentally has several advantages. It is not subject to the volatility of petroleum pricing, can be produced from green sources and is clean burning, having water vapor as the primary product of combustion. It also has a higher specific heating value than hydrocarbon fuels. For instance, its heating value is 2.75 times higher than that of JP-4 jet fuel. The combustion characteristics of hydrogen are superior to those of hydrocarbon fuels, and therefore internal combustion engines can run significantly more efficiently on hydrogen fuel. Current estimates show that despite complexities in producing and transporting liquid hydrogen, the cost per equivalent gallon of gasoline as low as 1-3 USD, competitive with current jet fuel costs. However, to be carried on board an aircraft, hydrogen must be in the liquid state.

One major impediment to widespread adaptation of liquid hydrogen as fuel for aircraft is its high specific volume, which is approximately 10 times greater than that of hydrocarbon fuels. Therefore a great deal of tankage is required to carry sufficient liquid hydrogen fuel on board for long endurance flight, which would necessitate substantially larger airframes than are used in contemporary airliners. Moving commercial flight airspace to high altitudes (>60,000 ft, or lower limits of the stratosphere) would require airframe designs that provide large wing surface and fuselage size in order to provide sufficient lift and aircraft efficiency to fly at these altitudes. Therefore, the wing and fuselage volume of high-altitude airframes can be significantly larger than those of lower-altitude aircraft, providing potentially adequate fuel storage capacity in the wings and fuselage to carry liquid hydrogen as fuel.

Flying a subsonic aircraft at very high-altitudes nominally requires less energy due to lower drag generated in the thin atmosphere. This can lead to potential gains in fuel efficiency. At altitudes in the stratosphere above 60,000 feet (over 18 km), the atmosphere is very thin (pressures <0.08 bar, or <1 psi, air density <0.1 kg/m$^3$) compared to typical cruising altitudes for conventional airliners at 11 km, where the pressure is ~0.2 bar (~3 psi) and air density about 0.35 kg/m$^3$. Aerodynamic craft designed for stratospheric flight encounter little air resistance and dynamic loads, allowing for very large lift-to-drag ratio as well as light-weight fuselage and wing designs to be implemented, leading to increased fuel efficiency.

With the exception of earlier turbojet military aircraft (i.e., Lockheed U2 and Ryan Compass Arrow) designed for subsonic stratospheric flight above 60,000 ft, flight at very high altitudes has been dominated by supersonic turbojet military aircraft. Tubojet engines, while capable of large power densities relative to reciprocating piston engines at low altitudes, have lower subsonic performance at high altitudes in comparison to piston engines driving propellers primarily due to the lower thrust produced as a result of the lack of sufficiently pressurized air. The delivered thrust of these engines at high altitude is on par with that of piston engines operating at the same altitudes. However the thrust-specific fuel consumption is significantly lower for piston engines compared to turbojets. Research and development of highly efficient turbojet engines for high altitude subsonic flight is prohibitively costly, and at the present time the market demand for such aircraft is low. Therefore, to pursue high altitude commercial flight, it is more cost effective to develop reciprocating piston engines for this purpose.

However, conventional spark-ignition reciprocating engines designed for propeller aircraft can function at such high altitudes only with significant modifications, such as the use of turbochargers. Historical examples of this type of engine modification for stratospheric flight are the ALTUS II unmanned aerial vehicle (UAV), developed by General Atomics for NASA, the Boeing-Teledyne Condor and the Grob Aircraft Strato 2C, all having made sustained flights at and above 60,000 ft during the 1990's. These aircraft were equipped with multi-cylinder gasoline (Otto cycle) reciprocating engines (i.e., Drake, Teledyne Continental and ROTAX) and two- or three-stage turbochargers. These modifications generally add significant weight (estimation of almost 3× increase of weight of engine equipped to fly at 85,000 ft vs. at 12,000 ft for same power output) and complexity and size to the engine (number of turbochargers, ducting, cooling heat exchanger stages), and cut operation efficiencies. Summarizing, while both subsonic and supersonic military jet aircraft are more commonly known to fly at very high altitudes, subsonic propeller driven aircraft equipped with conventional piston engine power plants offer greater fuel efficiencies than turbojet engines but with similar power densities at high altitude (Bents et al., "Propulsion System for Very High Altitude Subsonic Unmanned Aircraft" NASA/TM-1998-20636).

Exemplary endeavors have been made to develop high-efficiency propeller driven hydrogen-fueled aircraft for long duration flights at high altitudes (high altitude long endurance, or "HALE" unmanned aerial vehicles, or "UAV"). Examples of these are Aerovironment's Global Observer and Boeing's Phantom Eye and Phantom Ray UAV drones. U.S. Pat. Nos. 6,550,717, 7,281,681, 8,011,616 and 8,028,951 to MacCready et al. (Aerovironment Inc.) all describe a liquid hydrogen-fueled long endurance stratospheric aircraft equipped with high efficiency fuel cells for direct electricity generation to power electric engines driving propellers. Fuel efficiencies are gained from the direct conversion of hydrogen to electricity and many improvements in wing design and fuel storage and delivery. The aircraft is designed to carry a maximum payload of only a little over 100 kilograms. A variation of such an aircraft is described in U.S. Pat. No. 7,806,365 to Miller et al. (Boeing) wherein a liquid hydrogen powered aircraft designed for long endurance stratospheric flight at altitudes over 60,000 ft and carrying up to 700 kilogram payload is equipped with a turbocharged automobile or aircraft piston engine adapted to burn hydrogen. Much of the described invention is concerned with compressor cooling and configuration, as well as fuel handling. While capable of staying aloft for several days at a time, these aircraft are very light-weight and have been designed to carry only small payloads at low airspeeds, mainly to provide high altitude surveillance, communications links and other military or civilian satellite functions at a fraction of the cost of designing, launching and maintaining earth-orbiting satellites.

The above cited examples demonstrate the feasibility and advantages of using liquid hydrogen as a fuel source, despite its low energy density compared to hydrocarbon fuels such as gasoline (9.3 MJ/l compared to 33.5 MJ/l), for HALE flight. While the applications are more strategic and aimed at replacing more costly satellite-based surveillance and communication systems, the economics of carrying such low payloads with such a fuel capacity is not attractive for more common air transport. If the size of the HALE airframes can be modified and scaled up to dimensions more amenable to carry commercial payloads where the aircraft incorporates a highly efficient high power density reciprocating piston engine, the economics for HALE transport planes can become attractive.

The key to opening this doorway lies in the development of such a high efficiency engine. The standard design paradigms for Otto and Miller cycle reciprocating piston engines limit the maximum efficiency that can potentially be obtained. Therefore, the current engine design paradigms must be examined so that new ones can be introduced. To make such engines possible, a new application of engine dynamics and thermodynamics is needed.

BRIEF DESCRIPTION OF THE INVENTION

The present invention overcomes the inadequacies of the current engine design paradigm described above. The present invention comprises a spark-ignition (SI) hydrogen-fueled piston engine designed for high altitude flight above 60,000 ft and method of its operation, wherein variable compression ratios of between 50:1 and 100:1 are implemented, the compression ratios being substantially higher than used in conventional spark-ignited (SI) piston engines. The inventive engine is designed to obtain more than 70% indicated thermal efficiency while powering an aircraft carrying a substantial payload on the order of $10^5$ kilograms, wherein the fuel weight to payload weight ratio is less than 0.1 due to substantial fuel savings. A feature of the inventive engine that distinguishes it from conventional engine operation is that its efficiency increases with increasing altitude. In general, the principle aspects of the present invention deviate greatly from the conventional operational paradigms of spark-ignited reciprocating piston engines in order to provide long endurance flight in the stratosphere. Many of the aspects of the preferred embodiment of the inventive engine are practicable only at high-altitudes.

As an object of the present invention, the thermal efficiency is substantially increased compared to conventional Otto cycle SI engine by implementation of the embodiments of the invention resulting in substantial increase in the work extracted from the engine. Specifically, the embodiments described below enumerate methods of combustion temperatures management that result in a substantial augmentation of the area enclosed by the pressure-volume (PV) cycle plot representing the work output by the engine per cycle, so that the thermal efficiency, defined by the ratio of work output (area enclosed by PV plot) to energy input per cycle Q, derived from combustion of the fuel charge, is maximized. In the preferred embodiment of the inventive engine, the engine is arranged in a opposed-cylinder barrel configuration; whereby the combined length of any two opposed cylinders is sufficient to provide for a piston compression ratio of at least 60:1, preferably 80:1, and most preferably 100:1. The high piston compression ratios thus achieved in the preferred embodiment inter-alia obviate the need to provide for a high overall pressure ratio of the scavenged atmospheric air by employment of turbocharger compression machinery typically needed for high altitude reciprocating engines, that adds substantial weight to the engine and requires intercooler heat exchanger systems further increasing weight and complexity.

The high compression ratios inherent in the inventive engine are achieved by variation of the compression stroke length while maintaining a fixed combustion volume comprising a minimum axial dimension of 0.75 inch (19 mm). In the preferred embodiment, the long piston stroke lengths that are thus required to achieve the high compression ratios are divided between the opposed pistons. In this way, the individual cylinder length is cut in half, inter alia reducing engine size and piston wear.

Variation of the compression stroke length is accomplished by timing the closing of exhaust and intake valves disposed on the exterior wall of the cylinders after intake scavenging of fresh air is complete and the piston has traveled from BDC to a point in the cylinder where compression begins. In another embodiment, the piston rods are extensible during the compression stroke, allowing the engine to further increase compression ratio by decreasing the combustion volume at TDC by up to a factor of 2, while still maintaining a substantial combustion volume size. The ability to compact the combustion volume by up to a factor of 2 without increasing the cylinder length at BDC effectively increases the compression ratio by the same factor, or allowing up to a doubling of the compression ratio while engendering only an incremental increase in piston stroke length. The extensible piston rods also provide for the expansion ratio to be greater than the compression ratio. From the BDC position, the piston rods can be extended up to 1 inch (25 mm) so that the pistons are displaced up to 1 inch from their normal positions at BDC. The piston rods are contracted to return the pistons to initial BDC position at the end of the expansion stroke. In this way, the expansion ratio is greater than the compression ratio.

In another aspect of the preferred embodiment, peak combustion temperature management is further achieved by injection of water vapor into the combustion volume after compression and before ignition. Water vapor is obtained from heated liquid water whereby liquid water contained in a reservoir is used as a heat exchange fluid to cool the combustion chamber. The injected water vapor has the added advantage of producing increased post-ignition pressures in the combustion chamber while lowering the exhaust gas temperature.

While ambient temperatures 60,000 ft. and above are significantly colder than those at lower altitudes, in another embodiment cryogenic cooling is provided to scavenged atmospheric air by heat exchange with liquid hydrogen (LH2) coolant (ca. 20K) in the pre-compression phase of the engine cycle to temperatures substantially below atmospheric ambient of typically −80° F. (210K). In this way, autoignition of the fuel/air mixture is avoided at high compression (up to 100:1) because the temperature of the compressed air is below the autoignition temperature limit of hydrogen of about 1000° F. (>800K). As a further consequence of LH2 cooling of scavenged ambient air, the peak temperatures attained at combustion are lowered as well. In this way, peak combustion temperatures are managed in a predictable manner.

In yet another aspect of the preferred embodiment, gaseous hydrogen fuel is injected into the combustion volume. The gaseous hydrogen is heated by heat exchange with the combustion chambers prior to injection.

A further aspect of the preferred embodiment of the inventive engine is to provide complete combustion while the pistons are maintained at TDC, or constant combustion volume. Incomplete combustion contributes to what is referred to in the art as timing loss, whereby combustion continues during the expansion stroke, incrementally releasing energy during expansion, effectively lowering the compression ratio as this occurs closer to BDC. The inventive engine provides means whereby combustion of the hydrogen fuel is rapid and complete in the constant combustion volume before expansion stroke begins, suppressing any potential timing loss. In this way, the maximum amount of heat energy Q derived from the combustion is rapidly released into the combustion volume before commencement of the expansion stroke, allowing the peak pressure to attain the highest value possible before the the expansion of the exhaust gases.

It will be appreciated by persons skilled in the art that by complete combustion it is meant that the combustion reaction has reached thermodynamic equilibrium under the conditions of temperature and pressure inside the combustion volume. The reverse reaction of water dissociation is favored at high temperatures above 3140° F. (2000K). By means of temperature management schemes provided by the inventive engine, dissociation is suppressed, thereby obtaining the maximum amount of heat of combustion Q to be released before the expansion stroke begins.

In the preferred embodiment, the combustion reaction is rapid (less than 5 milliseconds) and completed before the expansion phase begins. In the preferred embodiment, a matrix of spark generation sites is disposed within the space cylinder head space comprised by the combustion volume to provide a simultaneous formation of a plurality of flame fronts generated from a regularly spaced array of ignition electrodes separated by ceramic insulators. Individual flame fronts are substantially spherical and allowed to propagate isotropically. The lateral propagation of the individual flame fronts is limited to half the distance between ignition points in the array, at which point the flame fronts coalesce. The extent of flame front propagation in the space surrounding the spark matrix is determined by the combustion volume, in particular the distance between piston crowns at TDC. The coalesced flame front then propagates axially to consume all unburned fuel in the combustion volume. A large combustion volume ensures that the inter-piston space at TDC is sufficient to accommodate the propagating flame front. In this manner, the peak combustion temperature and pressure are attained virtually instantaneously as combustion equilibrium is reached within the dwell period at TDC of up to 5 milliseconds. The maximum amount of combustion energy Q is thus converted to pressure-volume work at the top of the expansion stroke.

In a further aspect of the preferred embodiment, the axial distance between piston heads is optimized to yield a minimized surface-to-volume (A/V) ratio to reduce heat transfer losses due to surface contact with hot exhaust gases. In the preferred embodiment, the piston heads are manufactured from a low-heat conductance refractory material. The combustion volume is optimized by providing a distance between the piston heads that allows an optimal surface to volume (A/V) ratio to suppress heat transfer surface within the combustion volume, while at the same time maximizing the flame front contact area. In addition, the well-known wall-quenching effect of gas combustion reactions that occurs when gases are confined in narrow chambers is suppressed as the dimensions of the chamber substantially exceed the quenching distance for hydrogen (i.e., approx. 1 mm at phi=0.4). Other advantages of large combustion volume include substantially reduced crevice losses. In conventional engines, crevice volume can be as high as 15% of the total combustion volume. Crevice volume comprises narrow spaces inter alia between the piston and cylinder wall in which gases are trapped, and effectively remove this portion of the gas charge from the chamber as crevice combustion is suppressed by high heat transfer and quenching. A large combustion volume ensures that crevice loss is insignificant.

Immediately following combustion, a transient high temperature regime comprising the peak combustion temperature $T_3$ exists in the cylinder combustion volume. As discussed above, it is recognized that at high temperatures, a significant portion of the total combustion energy Q is partitioned into vibrational states of the gas molecules, and less is available as kinetic energy of the molecules. By allowing the exhaust gases to undergo rapid initial expansion under near-adiabatic conditions, hence rapid adiabatic cooling, the exhaust gases pass through the immediate post-combustion high temperature regime to a regime of lower temperatures. In the lower temperature regime, molecular vibrational states become depopulated, and energy that had been locked in these modes is returned to the molecules as kinetic energy available to perform pressure-volume work, as losses due to heat transfer are also diminished. Thus, in the preferred embodiment of the invention, a long expansion stroke of the piston is provided, wherein the exhaust gases spend a greater portion of the stroke duration in the low temperature regime, allowing a greater portion of Q to be converted to pressure-volume work, thereby increasing thermal efficiency. Power is obtained by use of large cylinders bores (8 inches or more), and increasing the compression ratio by varying the volume of scavenged air to obtain larger amounts of fuel charge (at constant combustion volume and constant equivalence ratio $\phi$) that in turn release greater amounts of Q per cycle when combusted. Large cylinder bores are also advantageous for maximizing the absolute force on the piston near the end of the expansion stroke when most of the combustion energy has been spent. The inventive engine is designed to operate at low values of rpm. Slow engine speed is especially advantageous for decreasing the friction fraction of power per cycle, allowing the energy loss to mechanical friction to be approximately 2%.

Recent efforts in homogeneous charge compression ignition (HCCI) free piston engine design have attempted to make use of some of the principles that the present invention embodies, however these engines suffer from inter alia lack precise ignition timing, making ignition timing difficult to control, low power and high cylinder pressures (c.f. Van Blarigan, Advanced Internal Combustion Engine Research, Proc. of the 2000 DOE Hydrogen Program Review NREL/CP-570-28890). The present invention succeeds in overcoming these and other issues that have restrained widespread application of such advanced engines. The embodiments that are presented herebelow are particularly useful for applications in ultra-high altitude flight, and will now be described in detail.

DETAILED DESCRIPTION OF THE EMBODIMENTS

Ultra-High Altitude Barrel Engine

FIGS. 1-4 illustrate the details of the preferred embodiment of the engine. FIG. 1a shows an isometric view of the inventive engine 100, showing all mechanical components and supporting superstructure. The radial symmetry of engine 100 is also evident. For simplicity, only three cylinders 102 of a plurality of cylinders are shown disposed in the central portion of engine 100, and coaxially oriented with central shaft 104 and positioned at 120° intervals around central shaft 104. The dual rotary end cams 106 are shown mounted at each end of central shaft 104. Each of the cylinders 102 contains a pair of opposed pistons (not visible) that are coupled to the end cams 106 at each end through piston rods.

Figure 1A:
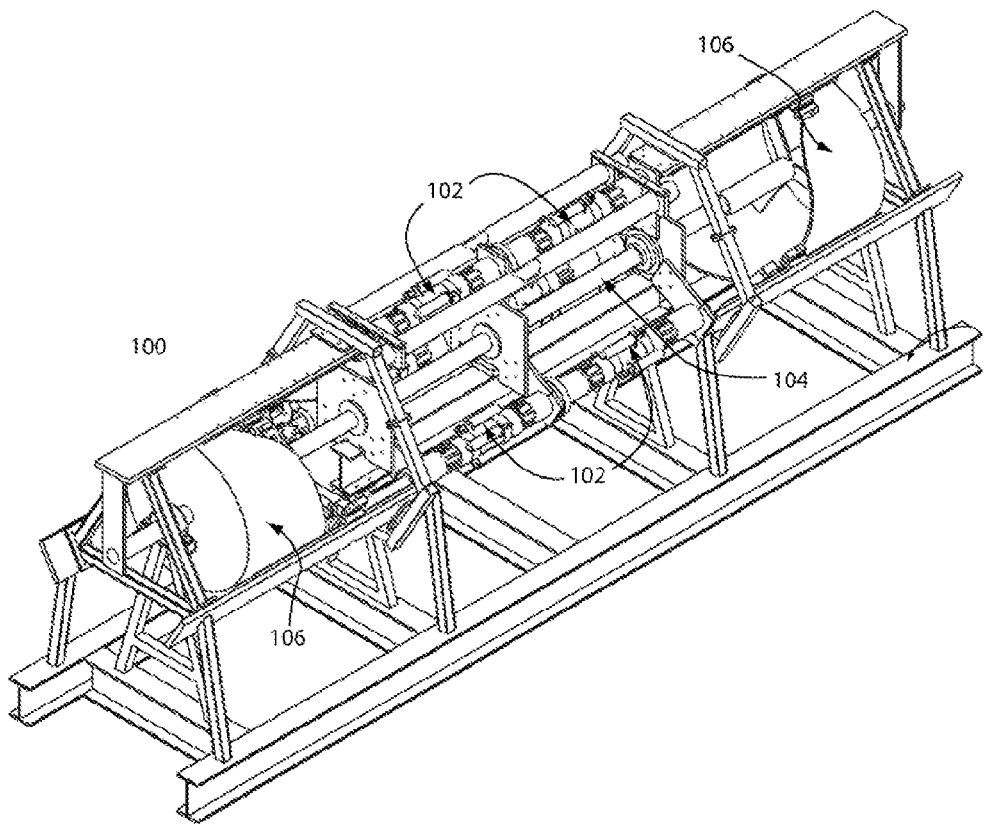
FIG. 1. An isometric view of the inventive engine.
Figure 1B:
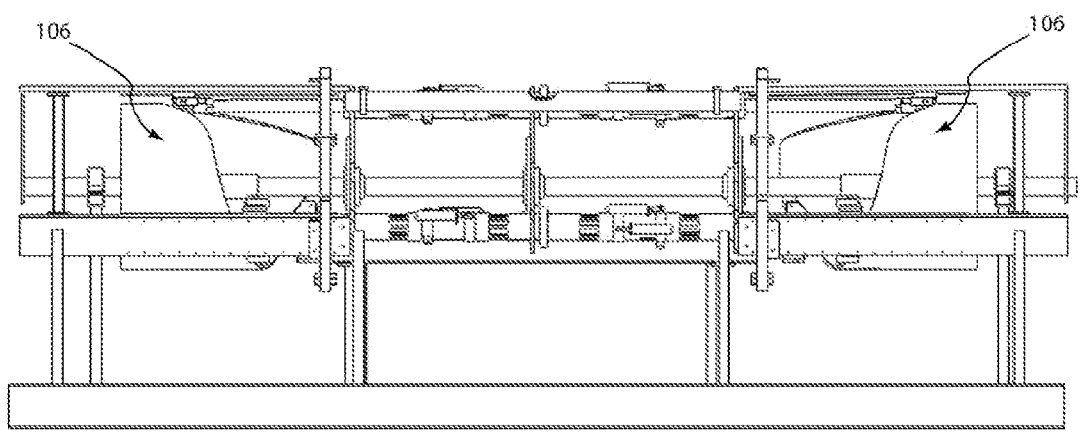
Figure 2:
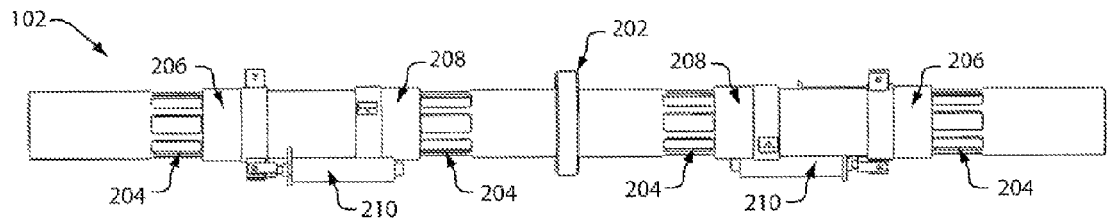
FIG. 2. A frontal view if the inventive engine.

FIG. 1b shows a frontal view of the same engine 100, showing the bilateral symmetry of the dual-cam engine. Each cam 106 is a mirror image of the other, whereby their cam profiles are aligned in opposition so that the pistons act in phase during operation. FIG. 2 is a depiction of an isolated cylinder 102, showing details of construction. Cylinder 102 is divided into two symmetrical halves, each half mirroring the other, with the plane of symmetry running through cylinder head 202. In each half, two rings of regularly spaced slotted ports 204 perforate the cylinder wall, one at the distal end and one at the proximal end, the proximal end being located near the cylinder head 202. Dual sleeve valves are mounted on the exterior wall on each half of the cylinder and serve to open and close valve ports 204. The sleeve valves disposed at the distal extremities of the cylinder comprise part of the intake valves 206, while the sleeve valves near the cylinder head comprise part of the exhaust valves 208. Sleeve valves 206 and 208 are actuated by air solenoids 210, wherein small pistons provide force to slide the sleeve valves over the slotted ports 204 to partially or completely open or close them in synchronization with the opposed piston movement.

Figure 3:
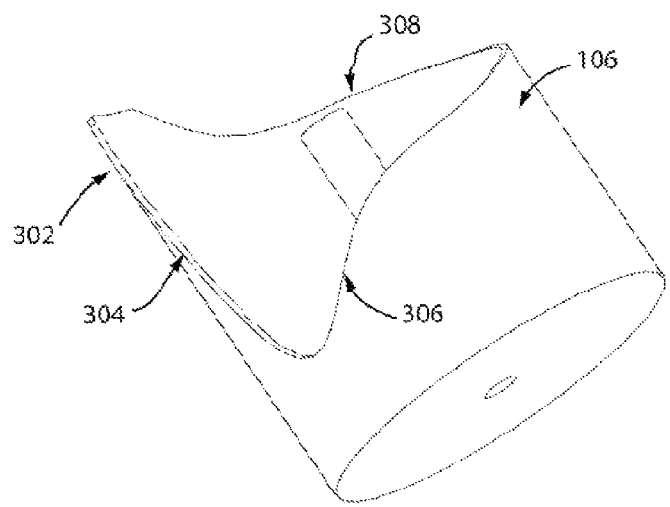
FIG. 3. An oblique view of rotary drum cam.
Figure 4:
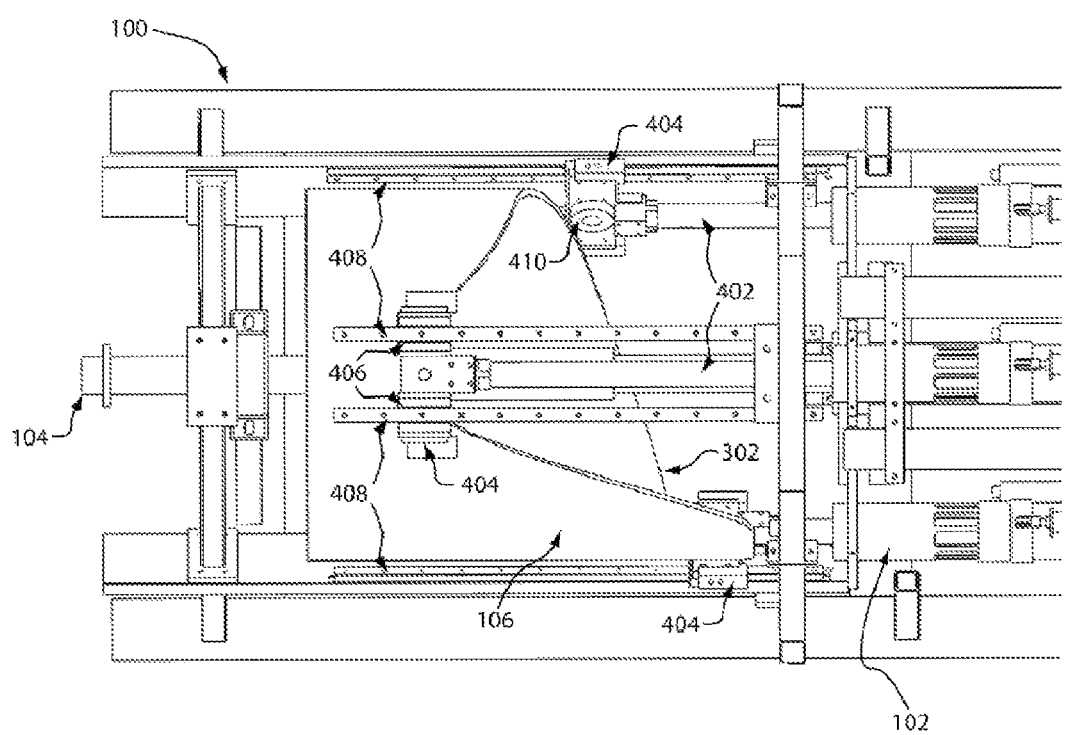
FIG. 4. A plan zoom view of the rotary drum cam mounted in the inventive engine.

FIG. 3 shows an isolated rotary end cam 106 in an oblique view, detailing a particular cam edge profile embodiment 302. FIG. 4 shows a detailed top view of end cam 106 mounted in engine 100 on shaft 104, with the piston rods 402 and outer piston rod heads 404 exposed. Outer rod heads 404 provide a means to couple the pistons drive rotary end cams 106. The rod heads 404 contain grooves 406 on either side of piston rod 402 that slide along guide rails 408 while riding along cam edge 302 via wheel 410.

Engine Cycle

Figure 5:
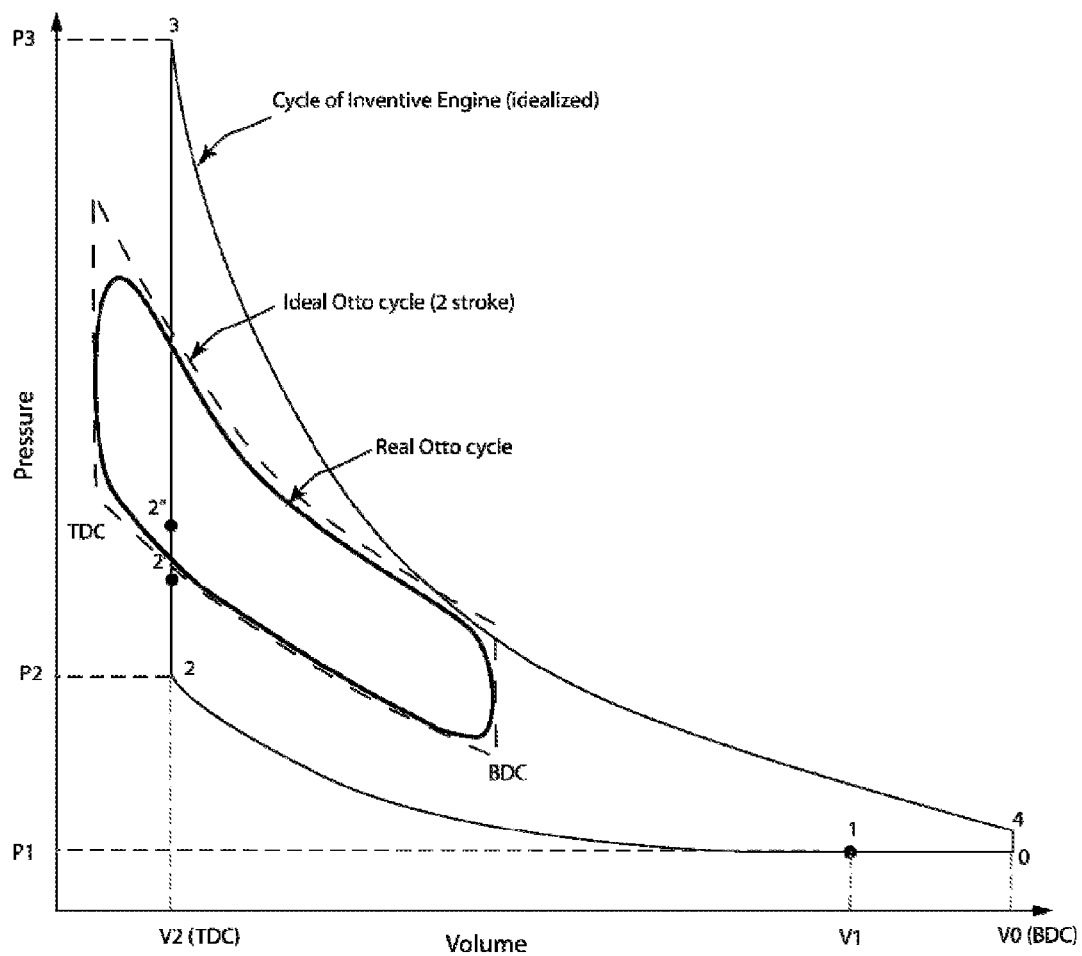
FIG. 5. Comparative diagram of an idealized fuel-air cycles representing the operation of the inventive engine and an idealized conventional two-stroke Otto cycle engine, including a real Otto cycle for a conventional crank-driven engine.

An exemplary schematic pressure-volume (PV) diagram of the two-stroke cycle for the inventive engine is presented in FIG. 5. The area enclosed by a PV cycle is the theoretical pressure-volume work extractable from one engine cycle. The indicated thermal cycle of the inventive engine is akin to an Atkinson cycle, in that the expansion ratio is longer than the compression ratio, but differs from a conventional Atkinson cycle by injecting gaseous hydrogen fuel and water in vapor form into the constant combustion volume V2 in the cylinder after the compression phase at P2, whereby the pressure is further augmented to P2', and further by the injection of water vapor into the constant combustion volume before ignition, whereby the pressure is augmented to P2". Upon spark ignition, the pressure jumps to peak pressure P3, and the temperature (not shown) to T3 (adiabatic flame temperature). Near-adiabatic expansion follows, where the pressure drops from P3 to P4, where P3 is the peak pressure, and P4 is the pressure in the interior of the cylinder when the pistons have reached BDC and can no longer travel. The volume of the cylinder V0 is the maximum cylinder volume at the BDC position. A constant-pressure upstroke of the pistons takes the cylinder volume from V0 to V1 as evidenced by the straight horizontal curve segment, from which point the compression of the air or other working fluid to V2 will commence where the cylinder pressure is again P2. A standard fuel-air cycle that is common in an Otto cycle is superimposed on the inventive engine cycle for comparison. The standard fuel air cycle is markedly smaller than the inventive engine cycle, notably by the much smaller compression/expansion ratio, and the smaller combustion volume V2. Moreover, a real Otto engine cycle is included within the standard fuel-air cycle to show the effects of actual engine operation on further diminishing of the PV work extractable.

Figure 6:
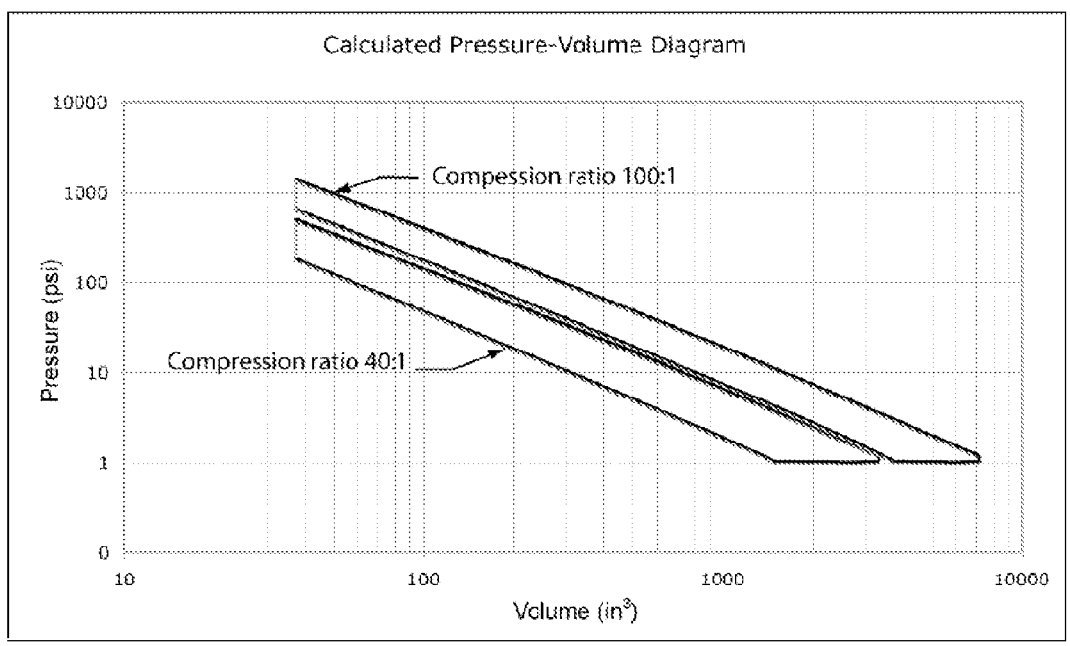
FIG. 6. Simulated pressure-volume (PV) cycle plot (log-log) for the inventive engine at two compression ratios.
Figure 7:
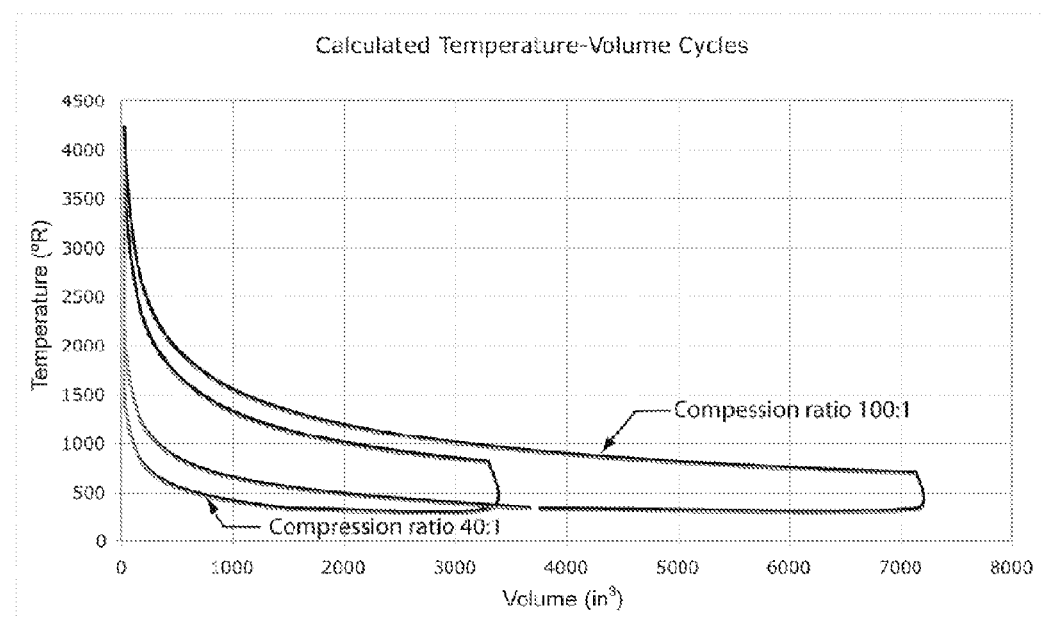
FIG. 7. Simulated temperature-volume (TV) cycle plot for the inventive engine at two compression ratios.

Examples of pressure-volume (PV) cycle plots for the inventive engine are shown in FIG. 6. These plots are shown in log-log form to clearly view the characteristics of the PV cycles. Moreover, the plots are realistic simulation results using computer algorithms based on an operating computer model of the inventive engine, having combustion kinetics and heat transfer parameters combined into the code. The simulation algorithms are fed input parameters such as initial temperature T1 and pressures P1 and P4, and temperatures of the fuel and water vapor, if any. For example, in these calculations the high altitude ambient air temperature was taken at −125° F. (186K) and ambient pressure at 1 psi (0.07 bar); hydrogen was injected at 100° F. (310K). The data demonstrate the effect of compression ratio on the high-altitude engine efficiency, which is 74% and 78% respectively for compression ratios of 40:1 and 100:1. It is noted that the expansion ratios are over double the corresponding compression ratios. A corresponding set of simulated temperature-volume (T-V) plots is shown in FIG. 7, where the temperature axis is shown in the Rankine scale.

Mechanical Action

Figure 8:
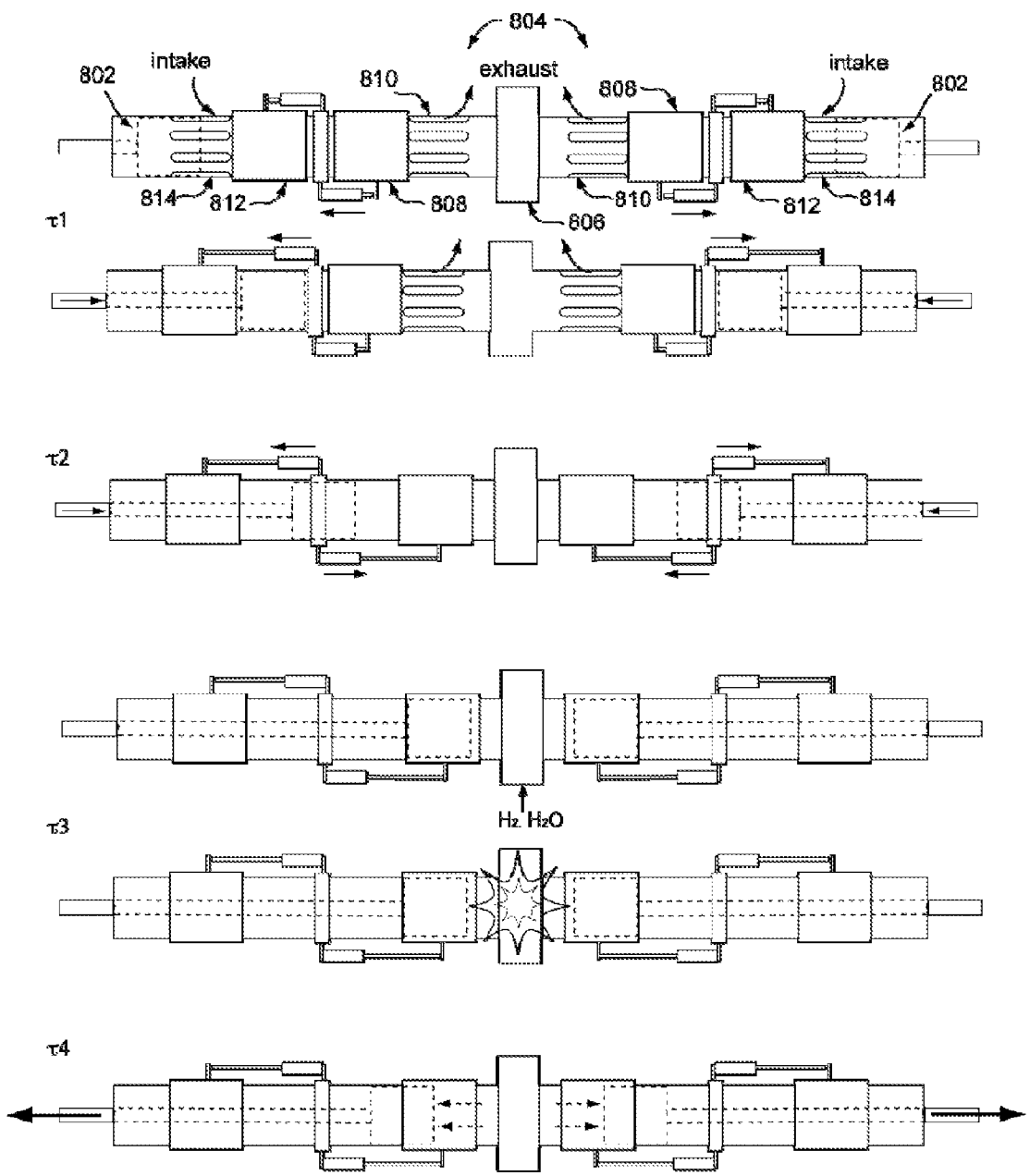
FIG. 8. Piston stroke and valve sequence diagram for an operation cycle of the inventive engine.

The engine cycle will now be described in greater mechanical detail. FIG. 8 shows a schematic representation of the valve operation and piston movement in the inventive engine cycle. Two pistons 802 (dashed lines) share a single cylinder 804, and are in an opposed configuration. The cylinder head 806 is positioned midway between the pistons. At a time τ1 the pistons are at or near their widest separation at V0, where the pistons are at the BDC position. Cylinder exhaust valves 808 (introduced in FIG. 2) are open to allow the exhaust gases from the expansion phase of the previous engine cycle, to exit through the exhaust ports 810. Exhaust gases from the previous cycle are at a pressure P4 that is higher than the ambient pressure P1. Immediately following the opening of exhaust valves 808, intake valve 812 opens within 3 to 5 milliseconds to receive a fresh charge of the working fluid through intake ports 814, such as, but not limited to, atmospheric air. The working fluid could also be argon or xenon. The working fluid serves to purge the cylinder of exhaust gases from the previous cycle.

At 60,000 ft, atmospheric air is commonly at a low temperature of approximately −70° F. (216K), for example, and at a nominal pressure of <1 psi (0.05 bar). In the preferred embodiment, the working fluid is ambient atmospheric air that is taken into the engine compartment from the exterior. In another embodiment, the air is cooled to a cryogenic temperature T1 below −280° F. (100K) by heat exchange with liquid hydrogen, then enters cylinder 804 while exhaust valves 808 and cylinder intake valve 812 are open. The momentum of the exhaust gases escaping through exhaust valves 808 creates a suction at the intake ports that pulls the air into the cylinder 804. Intake valves 812 are then closed, at which time the pistons begin to move toward each other with valves 808 remaining open to return the cylinder volume to V1 at constant pressure.

Referring again to FIG. 8, cylinder valves 808 are closed at time T2, and the atmospheric air or alternative working fluid occupying the cylinder volume is compressed as pistons move toward each other from their positions at V1 and stop at TDC, where the remaining volume in the cylinder is at a predetermined value of V2. With their travel extending longitudinally along cylinder 804 towards TDC, pistons 802 together produce a compression ratio at least 60:1, preferably 80:1. The compression stoke is divided between each piston, so each piston provides one-half the stroke. In this way the piston stroke length is cut in half, reducing friction and making for a more mechanically stable overall structure.

A unique aspect of the present invention is that at the ultra-high altitudes, due to the very low ambient values of P1, typically under 0.05 bar (<1 psi), very high compression ratios (up to 100:1) can be employed in the engine design and operation. At lower altitudes high compression ratios can result inter alia in autoignition in spark-ignition engines due to values of T2 exceeding the autoignition temperature of the fuel. Hydrogen has a high autoignition temperature (Ultra-high altitudes are thus amenable to engine operation using high compression ratios because P2 values are limited to no more than 6 bars (100 psi) or less. This also permits lightweight materials such as aluminum to be used for the construction of thin-walled cylinders. Moreover, light weight pistons can be employed that have reduced inertia for achieving high acceleration on expansion and lower frictional forces compared to heavier materials such as steel.

Still referring to FIG. 8, following the compression phase at time τ3, gaseous hydrogen is charged into cylinder 804 at constant volume V2, between pistons at a fuel port. The pressure is then raised to a value P2' following the charging of the gaseous hydrogen. In the preferred embodiment, the hydrogen gas is heated to temperatures of 100° F. (315K) or more and then charged into the cylinder. The advantage of introducing a warmed hydrogen charge is that the heat carries energy into the system, resulting in a higher pre-combustion temperature of the cylinder, but also resulting in a higher pressure P3 to be realized after ignition. This increase in pressure P3 outweighs the increased temperature T3 that may also result because of the greater work extracted that also results mitigates losses due to partitioning and heat transfer, as explained in greater detail throughout this disclosure.

As a further means of mitigating peak combustion temperature T3, steam is introduced into the cylinder head 806 at this stage via a water vapor or steam valve/port (not shown) that may be positioned adjacent and operate in a manner similar to a fuel valve/port (not shown). In one preferred embodiment, water vapor or steam at a specific temperature is injected into the combustion volume immediately preceding combustion. All valves are closed and the hydrogen fuel is spark-ignited in the constant volume V2 combustion region at TDC.

In the preferred embodiment, a spark matrix (explained below) is used to induce instantaneous and uniform combustion in the constant combustion volume. As described in greater detail above, the combustion is almost instantaneous, reaching completion rapidly following ignition. In the preferred embodiment of the invention, the combustion volume remains constant or nearly constant until the combustion is complete. The equivalence ratio φ ranges from 0.3 to 0.7, preferably maintained at 0.4. During and immediately following combustion, the interior of cylinder 804 has a very high temperature due to the combustion of the hydrogen fuel. The presence of water vapor mitigates temperature rise by absorbing a portion of the heat of combustion within the constant volume of the combustion chamber resulting in a lowering of temperatures and increasing pressures (P3 or immediately following the peak) without causing partition losses of the combustion energy, making available a greater portion of the Q released to be extracted as work.

Referring one more time to FIG. 8, time τ4 finally marks the beginning of the expansion stroke. After a short dwell period at TDC, expansion immediately follows combustion whereby in an initial phase of the expansion stroke, the pistons freely accelerate towards BDC without mechanical constraints as explained below. The initial piston speed is high, over 60 feet per second (20 m/s). By rapid piston expansion, substantial mitigation of heat transfer losses through the cylinder walls results as will be explained in the following section.

Method of Combustion Temperature Management

Following the principles enumerated above and explained in greater detail in Appendix A, a method of management of combustion temperatures is described herewith. In the preferred embodiment, the method comprises the step of water vapor or steam injection or fumigation into the combustion volume after compression of the scavenged air. The temperature of the water vapor or steam is high enough so that the pressure of the water vapor or steam is above P2. As an example, for injection of saturated steam, if P2 is 500 psi, (34 bar) the steam temperature must be at least 470° F. (517K). Other examples of steam injection for the purposes of managing combustion temperatures are disclosed in U.S. Pat. No. 7,051,720 to Gottemoller et al., and U.S. Pat. No. 7,530,349 to Rim. This step is followed by the step of injection of warmed gaseous hydrogen, whose temperature is 100° F. (311K) or more, into the combustion volume before ignition. In another embodiment, the method of combustion temperature management comprises an additional step of cooling the atmospheric air scavenged into the cylinder to T1 temperatures well below ambient (<−82° F. (210K) by a cooling system using liquid hydrogen. The equivalence ratio φ of the charge is maintained between 0.3-0.6, preferably φ=0.4. In this way, peak combustion temperatures remain below 3700° F. (2300K). Another use of liquid hydrogen in airplane engines is for cooling of turbochargers, as described in U.S. Pat. No. 5,167,117 to Herzog et al.

The method further comprises the step of rapid and complete combustion at constant volume. The dwell of the piston at TDC is timed to be less than 5 milliseconds before the expansion stroke begins, allowing time for combustion to complete and at the same time greatly diminish heat transfer by short exposure of the cylinder walls to the high temperatures produced during combustion. By management of the peak combustion temperatures to below 3700° F. (2300K) using the charge preparation methods enumerated above, endothermic water (product of combustion) dissociation is suppressed, maintaining favorable equilibrium partial pressures of the reaction species, and ensuring that the reaction quantitative (complete) before expansion begins.

Combustion Volume Optimization

In one aspect of the preferred embodiment, the combustion volume or clearance volume is optimized so that the ratio of the heat transfer surface area to the combustion volume (A/V) is reduced to a minimum to reduce heat transfer losses during combustion. Insulated piston faces are provided, whereby the insulation material is a refractory ceramic or other low-heat conduction metal. The combustion volume comprises V2, which is divided between two opposed cylinders. In the preferred embodiment, V2 is set between 35 $inch^3$ to 75 $inch^3$ (575 $cm^3$ to 1230 $cm^3$). For a typical cylinder bore of 8 inches (20 cm), the distance between pistons at TDC is then 0.75 in to 1.5 inches (1.9 cm to 3.8 cm).

Complete Combustion at TDC

Indeed the flame front is so slow on the time scale of the piston stroke that ignition timing is typically advanced to about 10-40 degrees before TDC, and is not complete until up to about 40 degrees after TDC. The peak pressure does not develop until about 15 degrees after TDC, and combustion continues well after TDC (Heywood, 1988). Inefficiencies are then incurred by this practice in terms of accessing extractable work.

In conventional SI engines, a single sparkplug is used to ignite the combustion mixture. A consequence of this is that the flame front, having a finite velocity, takes time on the order of milliseconds to advance over the complete reaction volume. In the preferred embodiment, a spark ignition matrix is inserted into the combustion volume to engender multiple points of ignition at regular intervals that ensure uniform combustion of the fuel/air charge within the combustion volume. The spark matrix comprises a plurality of spark generation nodes that are meshed with regular (or irregular) spacings set in such a way that the individual flame fronts simultaneously ignited at each node will coalesce within a very short time (<5 milliseconds) to uniformly burn the fuel charge within the clearance volume. Distances between nodes are a small fraction of the characteristic dimensions of the combustion volume. The distribution of spark ignition points within the combustion volume at regular intervals ensures that the entire charge is combusted simultaneously over the entire volume within several microseconds. The complete combustion releases all of its energy Q at once and providing a completely burned exhaust gas mixture.

Figure 9:
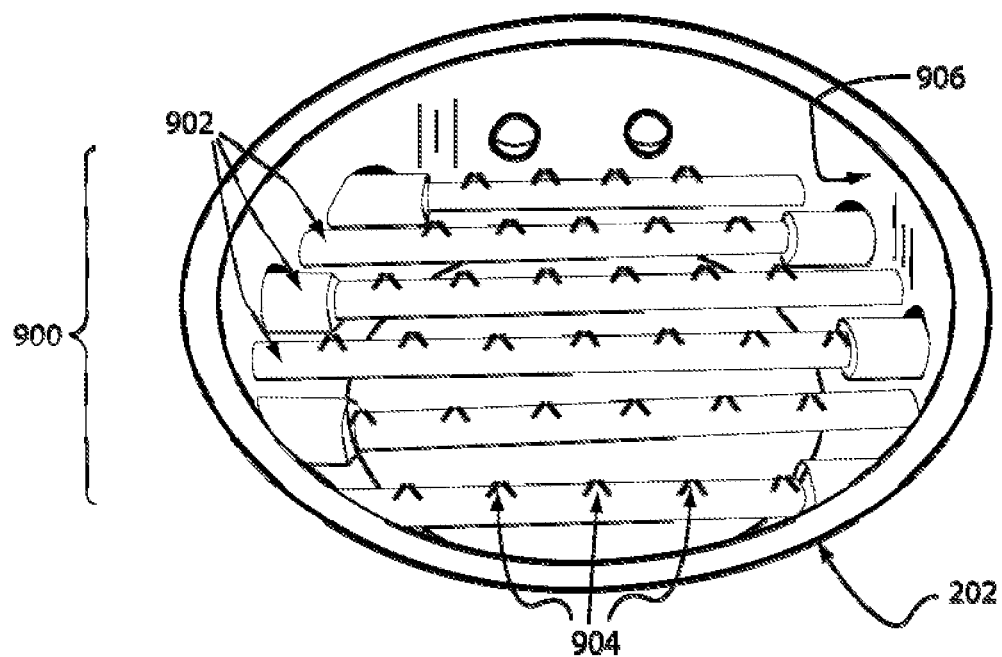
FIG. 9. Spark matrix ignition system shown in oblique view and shown as mounted in a piston head.

An example of a spark matrix mounted in the cylinder head 202 (introduced in FIG. 2) is shown in FIG. 9 in oblique view. The spark matrix 900 is fabricated from a plurality of ceramic tubes 902 through which solid wire is passed through holes in the side of the tubes to form a plurality of spark-gap electrodes 904 distributed at regular intervals along each ceramic tube 902. Multiple tubes with such spark gaps are inserted through the cylinder wall 906 in the cylinder head, whereby they are parallel and spaced apart by a predetermined distance to minimize flame front travel. In a particular embodiment of the spark matrix, the electrodes are spaced at 0.5 inch (12 mm) intervals. Ceramic tubes are utilized to provide structural support and electrically insulate the electrodes, but these needs can be met by other geometries and means of support. The spacing is by no means limited to this dimension, and can take on any suitable interval distance. Ceramic tubes 902 are inserted through the wall 906 of the cylinder head 202 contain a plurality of hole pairs forming a row perforating the tubular wall. The hole pairs are spaced apart by the matrix interval. The ends of wire segments of heavy gauge solid wire are passed through one hole in a pair to the next hole in an adjacent pair, passing the wire segment from the interior the tube 902. The wire end protrudes through the holes, hence forming the spark-gap electrodes. A spark gap is formed when the ends of the separate wire segments that protrude through both holes in a pair are bent towards each other to form a small gap between them. Thus, repeating this process using separate wire segments forms a series of spark gap electrodes. The spark-gap electrodes thus formed on a single ceramic tube 902 are in electrical series. At the end of the ceramic tube remaining on the exterior of the cylinder head, a high voltage electrical connector is attached and provides a connection to an external spark generator. The spark generator creates an extremely high voltage as the total gap spacing is about 0.25 inch (6 mm) for each tube, and furthermore delivers a large amount of energy per spark gap to ensure ignition at each point in the spark matrix 900. This can be accomplished by using a standard dual spark coil in series with a high voltage capacitor bank to deliver the energy to the sparks. The coil can generated up to 100 kV to break down the high pressure gas mixture and the capacitor bank provides the current to create a much more powerful spark once the gaps broke down. In other embodiments of the spark matrix, electrodes can be disposed to protrude from opposite sides of the ceramic tubes to face both pistons, or two opposite-facing spark matrices can be mounted in the same cylinder head.

The expansion of the plurality of individual flame fronts to coalescence is rapid enough (sub-millisecond) to burn the fuel charge to completion before the piston begins its expansion stroke, or while the piston is still at TDC. In this way, the ignition is virtually instantaneous. Peak pressure P3 occurs therefore at TDC, in contrast to conventional spark-ignition timing, causing the force on the piston to be maximal at the beginning of the expansion stroke. Moreover, the mechanical resistance to piston expansion is minimized, as embodied in the present invention, allowing the piston to accelerate almost freely on expansion. The piston acceleration, however, does not exceed that of the expanding exhaust gases. The combination of these aspects provides for the maximum amount of work to be extracted from the fuel charge.

Rapid Piston Acceleration

The method further comprises the step of rapid piston acceleration at the beginning of the expansion stroke in order to accomplish the objects of the invention set forth above. Rapid piston acceleration greatly minimizes any heat transfer losses through the conductive surfaces of the cylinder by decreasing the time that the exhaust gases spend in the high temperature regime to several microseconds, a time scale shorter than the time scale for convective and conductive heat transfer through the cylinder walls. In a preferred embodiment, rapid expansion acceleration is provided by a rotary end-cam with a profiled rim upon which the piston rod is abutted but not attached, providing a means to convert the linear momentum of the piston during the expansion stroke to rotary motion of the engine. The cam rim profile provides a preset linear trajectory of the piston as a function of rotary angle, determined by flat or positive- and negative-going sloped segments. In this way, the pre-compression, compression and expansion stroke cycle phases, as well as dwell times are sequenced and synchronized with ignition timing.

The compression and expansion stroke lengths are determined by the "vertical" travel distance I (parallel to the axis) of the piston rod engaged along a cam segment, which in turn is defined by the slope angle $\theta$ with respect to the cam axis and the arc length of the segment. Pre-compression and compression stroke velocities and dwell times, if any, are set by the slope angles and arc lengths of the segments by which the slopes are subtended, and rotational speed $\omega$ of the cam. In particular, the expansion stroke length is defined by a segment of the rim, henceforth referred to as the power segment, wherein the slope angle $\theta$ with respect to the cam axis is the smallest of all slope angles and is negative in that the profile falls towards the bottom edge of the cam. The power segment comprises the sharpest slope angle and shortest arc length of the cam profile, thereby providing a relatively long vertical (axial) travel distance I of the piston along the segment.

The power segment further comprises a portion of the cam profile that is chosen to allow the expansion stroke to begin immediately after the short dwell time and travel for an optimal distance with no mechanical constraint. The power segment profile comprises a first and second part; the first part has a slope angle of substantially zero degrees with respect to the cam axis (a "vertical" angle), providing for free acceleration of the piston trajectory, wherein the piston experiences substantially no mechanical constraint. The acceleration is determined by the instantaneous force profile in the cylinder. This portion of the piston trajectory has similarities to free piston engine operation. The second part of the profile follows a mathematically determined curvature that smoothly joins the "vertical" angle of the first part, for example but by no means limited to, a function such as log(x), to engage the piston force by rapidly but smoothly changing the slope angle from 0° to 90° with respect to the cam axis before the piston reaches BDC. In contrast, piston motion is sinusoidal in more conventional crank-driven engines. In the present invention, the piston speed decelerates rapidly from its value at the moment of engagement with the cam rim, to zero velocity at BDC, imparting the instantaneous force of the exhaust gases via the piston on the cam rim to induce rotational motion.

In the preferred embodiment, a rotatable wheel 410 (introduced in FIG. 4) attached to the end of the piston rod 402 abuts the rim of the rotary cam and provides a rollable engagement means to ride along the rim profile as the cam rotates. The wheel can also be replaced by roller bearings or a ball bearing riding freely on the rim surface, or constrained to roll inside of a grooved track along the rim.

The advantage of initial rapid expansion for efficiency gain is illustrated by the simulated temperature-volume cycle (T-V) curves introduced in FIG. 7. Each curve is calculated for a different compression ratio, and has the same V2 with different V1. What is important to observe is the rapid decay of the temperature profile during the expansion phase between T3 and T4. The curves show that the regime of rapid temperature decay occurs in the initial part of the expansion, therefore a fast acceleration on expansion allows the exhaust gases to pass out of the high temperature regime early in the expansion stroke, greatly reducing losses due to heat transfer. Once past this regime, temperatures of the exhaust gases are lower, allowing Q that has been locked in vibrational modes at high temperature to be returned to translational modes manifest as piston kinetic energy for the majority of the expansion stroke. This contrasts with conventional engines, where long dwell periods near TDC and relatively slow acceleration of the piston account for a great deal of heat loss, rapid cooling during expansion. The resulting loss of efficiency in conventional engines due to a lingering piston while the exhaust gases are still very hot is significant (see Appendix A).

One of the reasons for the effect of compression ratio on thermal efficiencies is evident by comparison of the T-V curves of FIG. 7. The high temperature decay regime occupies a greater portion of the expansion volume as the compression ratio decreases. Thus, for a compression ratio of 100:1, a 50% reduction in temperature occurs within the first approximately 6% of the expansion volume. For a compression ratio of 40:1, the same 50% reduction in temperature occurs within the first approximately 27% of the expansion volume. This means that the exhaust gases are exposed to high temperatures longer expansion stroke spends less time at the highest temperatures possible than a longer expansion stroke, because in the high temperature regime, the heat of combustion is locked in vibrational states and the combustion reaction is not complete as the hydrogen combustion equilibrium constant has a steep negative temperature dependence $K=0.0835T^{-1.3565}\exp(58171/T)$ (Norbert Peters, Institute for Combustion Technology, DLR, Stuttgart, see Appendix A). The extent of combustion can change over the indicated temperature range by several percent if measured by the mass fraction of the product water at equilibrium, as the exhaust gas temperature changes from over 3500° F. (2200K) peak combustion temperature to approximately 1340° F. (1000K) at the edge of the high temperature regime envelope.

Mechanical Coupling of the Pistons

Referring again to FIGS. 3 and 4, a top view of rotary end-cam 106 shows the cammed edge 302 that outer heads 404 of pistons rods 402 slide or roll along. The cam serves to couple the linear motion of the pistons to rotational motion to eventually drive a propeller.

During expansion phase, outer heads 404 push against the power drive segment 304 of cam edge 302. Power segment 404 has such a slope or angle of declination that the pushing of outer heads 404 induces rotation of rotary end-cam 106. Ignition timing is synchronized with the cam motion so that the cylinder will begin the expansion phase when the outer heads 404 that ride along the cam edge 302 approach the power segment and complete the expansion phase when outer heads 404 reach the end of segment 304, thereby driving any couple drive or generator mechanism. In addition, the slope or angle of power segment 304 sets the rotational speed of the inventive engine in terms of rpm by the ratio of the arc length in degrees of the power segment 304 by the amount of time for each of the pistons to travel along the power segment, which is a function of the piston velocity-time profile. The travel time along the power segment is equivalent to the axial component of the length of the segment divided by the average piston velocity. Engine 100 includes a sufficient number of cylinders 102 so that the outer heads 404 of at least two pistons are driving against drive segment 304 at any time to provide continuous powered drive of the inventive engine.

During an intake phase, outer heads 404 slide or roll along a second drive segment 306 of cam edge 302 having a small slope moving the piston from BDC to the point where the compression stroke begins.

During compression phase, outer heads 404 are pushed by a third drive segment 308 of cam edge 302 to induce the compression stroke. Drive segment 308 has such a shallower slope or angle than drive segment 304 so as to fix the speed of the cam for a given rotational speed.

Figure 10:
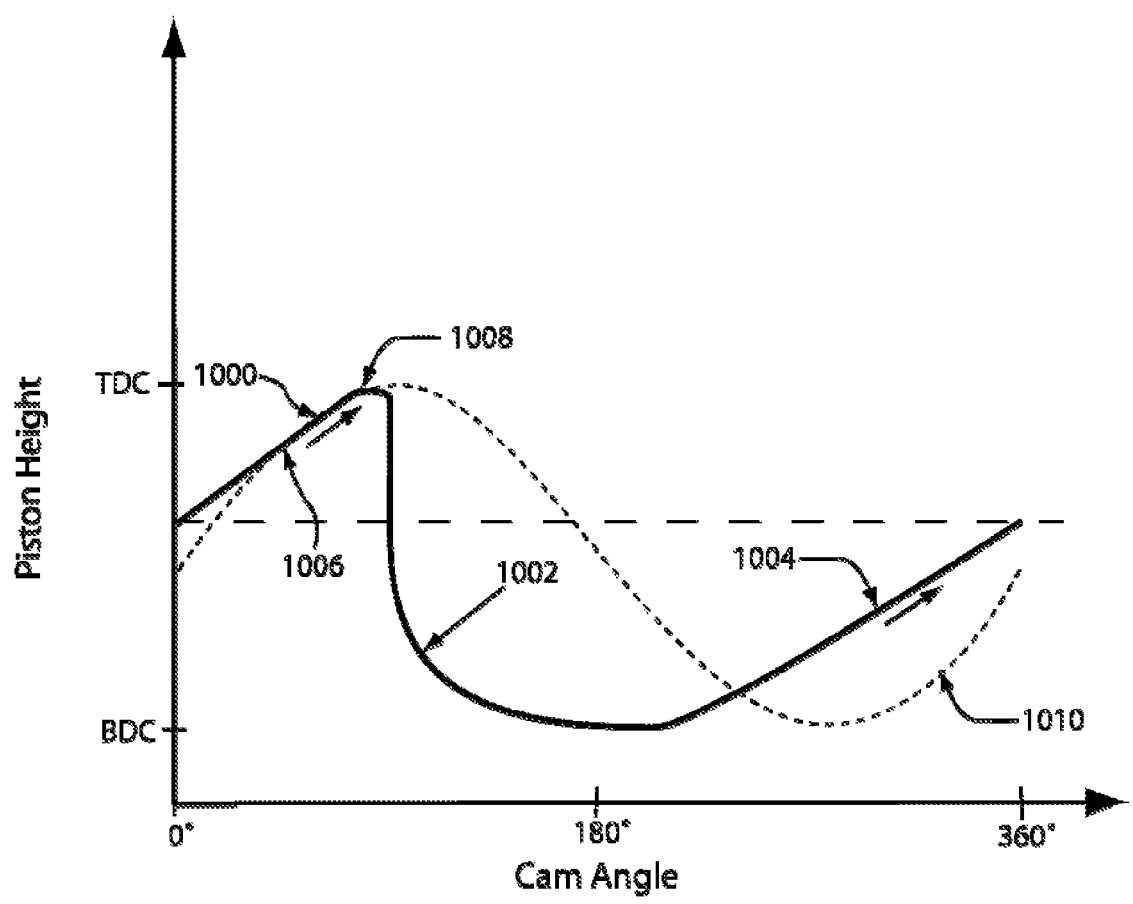
FIG. 10. Representative cam profile displayed as a diagram of piston height as a function of cam angle, compared to a sinusoidal piston motion curve (normalized) seen in standard crank-driven piston engines.

It will be appreciated by those skilled in the art that more than one configuration of cam edge 302 is possible. For instance, more than one power drive segments can be implemented to multiply the rotational speed by synchronizing the expansion of multiple phase pistons. A representative cam profile 1000 is shown in FIG. 10, depicting a power drive segment 1002 (segment 304 of FIG. 3) profile approximating a log(x) curve. The drive profile corresponds to the expansion stroke. It will be appreciated by persons skilled in the art that the particular curvature of drive segment 1002 can take on any appropriate shape, and the log functionality approximation represents a particular embodiment. Drive segment 1002 is longer than compression segment 1006 by a factor of greater than two, corresponding to a longer expansion ratio than compression ratio and the P-V and T-V plots of FIGS. 6 and 7, respectively. Corresponding intake segment 1004, compression stroke segment 1006 and dwell TDC dwell segment 1008 are also shown to complete the cam profile 1000. For comparison, a conventional sinusoidal profile 1010 of piston motion in a crank-driven engine is superimposed on the cam profile. It is readily seen that the dwell time at TDC is substantially less and the expansion stroke 1002 of cam profile 1000 is substantially faster than that of a conventional crank-driven engine. Cam profile 1000 is also highly asymmetrical.

Hydrogen Fuel System

Figure 11:
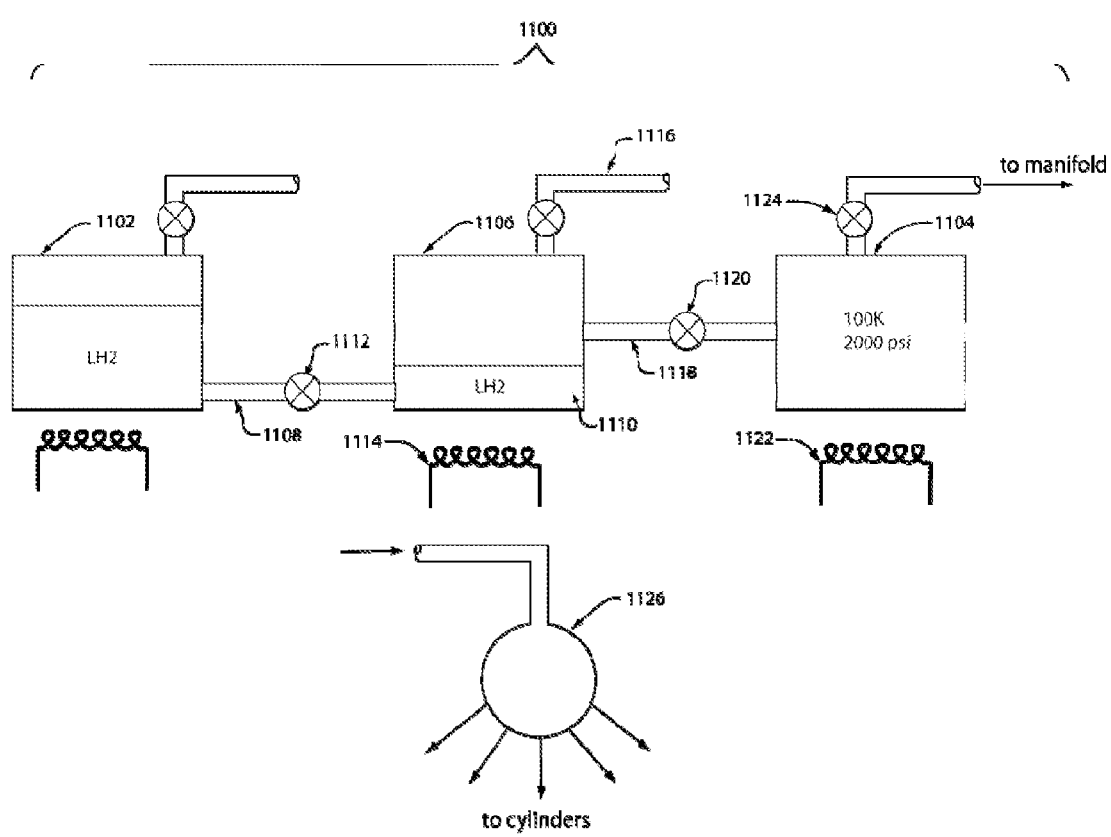
FIG. 11 Hydrogen fuel handling system block diagram.

FIG. 11 depicts a schematic diagram of one implementation of a hydrogen fuel system 1100 from which hydrogen fuel is provided to engine 100. Hydrogen fuel system 1100 includes a primary liquid hydrogen fuel storage tank 1102, a fuel preheating tank 1104, and a fuel transfer tank 1106 positioned between storage tank 1102 and preheating tank 1104.

Fuel transfer tank 1106 is coupled to main fuel tank 1102 by a conduit 1108 to receive a transfer volume of hydrogen 1110 whenever a transfer valve 1112 is open. The transfer volume of hydrogen 1110 is referred to as transfer hydrogen 1110 and passes from main tank 1102 to transfer tank 1106 in liquid form. In one implementation, fuel transfer tank 1106 has a fuel capacity of about 220 g of liquid hydrogen.

A transfer tank heater 1114 heats each transfer volume of hydrogen 1110 to gasify the transfer hydrogen. Transfer valve 1112 is closed during the heating of the transfer hydrogen 1110 to prevent the gasified transfer hydrogen from being backed into main tank 1102. A transfer tank vent 1116 vents gasified transfer hydrogen 1110 if an overpressure condition occurs.

Fuel preheating tank 1104 is coupled to fuel transfer tank 1106 by a conduit 1118 to receive transfer volume of hydrogen 1110 from fuel transfer tank 1106 whenever a transfer valve 1120 is open. The transfer volume of hydrogen 1110 passes from fuel transfer tank 1106 to preheating tank 1104 in gaseous form. In one implementation, preheating tank 1104 has the same fuel capacity as fuel transfer tank 1106. Fuel transfer tank 1106 functions as a pump to transfer from main fuel tank 1102 to preheating fuel tank 1104 hydrogen at the ultra low temperature of about 10 degrees Kelvin. It will be appreciated that conventional pumps would be inoperable at such temperatures. Inside preheating fuel tank 1104 the transfer hydrogen 1110 is then preheated in preparation for combustion within a cylinder 102 of the inventive engine. Accordingly, the high pressure of transfer hydrogen 1110 in transfer tank 1106 functions to move the transfer hydrogen 1110 from transfer tank 1106 to preheating tank 1104.

A preheating tank heater 1122 extracts heat from the engine cylinders (not shown) by means of a counter-current heat exchange system, and heats each transfer volume of hydrogen 1110 to a temperature of about 100 degrees Kelvin, and a high pressure of about 2000 psi (133 bars), for example. Transfer valve 1120 is closed during the preheating of the transfer hydrogen 1110 in preheating tank 1104 to prevent the preheated transfer hydrogen from being backed into transfer tank 1106. Upon completion of preheating of the transfer hydrogen 1110, an engine fuel valve 1124 is opened to transfer the transfer hydrogen 1110 to a fuel manifold 1126 where the transfer hydrogen 1110 is directed to the combustion volume of the next cylinder 102 to undergo combustion.

Transfer hydrogen 1110 is passed to the combustion volume at a temperature of about 100° F. (310K) or more and at a pressure higher than P2, for example at least 200 psi. Combustion of the transfer hydrogen 1100 in the combustion volume is ignited. The maximum temperature of hydrogen burning in air is about 3700° F. (2300K). Even so, the ultra-long stroke of pistons and the at least 100-fold expansion of combustion volume results in cylinder 102 having a temperature T4 of about 150° F. (340K) at the conclusion of the expansion stroke.

Overall Improvements Provided by the Inventive Engine

A summary of improvements made by the inventive engine design and operation is provided in Table I. These improvements are presented in terms of losses that are mitigated by the inventive engine, and compared to the same losses experienced by standard Otto cycle gasoline engines.

TABLE I

Summary of Improvements

| Losses | Gas Engine (spark ignition) | Boeing UAV H2 Engine at 60K | SFS H2 Engine at 75K |
|---|---|---|---|
| Irreversible Entropy of Combustion (%) | 19.5 | 19.0 | 7.0 |
| Exhaust Loss (%) | 23.2 | 23.0 | 13.3 |
| Heat Transfer (%) | 19.5 | 17.0 | 2.4 |
| Indicated Thermal Efficiency ($\eta 1$) | 37.8 | 41.0 | 77.3 |
| Volumeric Losses (%) | 4.7 | 2.0 | N/A |
| Multistage Compressor and Heat Exchange Losses (%) | N/A | 11.5 | N/A |
| Mechanical Losses (%) | 6.1 | 6.1 | 2.0 |
| Brake HP Efficiency (%) | 27 | 21.4 | 75.3 |
| Spec. Fuel Consumption lbs/HP/hr | 0.498 | 0.225 | 0.064 |

Notes:
1. Gas engine is an idealized composite and doesn't represent any particular engine
2. Boeing numbers are estimates based on best available information
3. SFS numbers are derived from laboratory engine measurements and other experimental data Table I shows the drastic improvements in elimination of losses and most notably engine efficiency. Concerning the latter, engine efficiencies are increased to well over 70%, a major improvement over the standard Otto cycle engine. These numbers are confirmed by experimental and model data. The stated efficiencies are calculated by combining the per cent losses and subtracting from 100% efficiency. The data for the gas engine are taken from Heywood (Internal Combustion Engine Fundamentals, McGraw-Hill, 1988). Data for the H2 engine are from calculated from the model.

In view of the embodiments discussed above and their various aspects, it will be appreciated that the detailed description of the various embodiments are illustrative only and are by no means to be construed as limiting the scope and spirit of the invention. Rather, we claim as our invention all such embodiments as may come within the scope and spirit of the invention as expressed in the claims that follow the supporting Appendix, and equivalents thereto.

Appendix A

General Considerations

For illustrative purposes, the idealized pressure-volume (PV) two-stroke cycle for a depicted in FIG. 5, and described herebelow. The discussion that follows refers to FIG. 5 for the description of curves and state variables P, V, and T. Attention is drawn to the fact that the curves depicted are illustrative only, and not to actual scale.

At state 0 of the idealized cycle, the piston is at the bottom dead center (BDC) position, where the cylinder has a maximum void volume V0. Air being the working fluid, has been scavenged during the previous cycle with intake and exhaust ports open, and undergoes a purge at constant pressure P1 to remove remaining exhaust by moving the piston from V0 to V1 with the exhaust port remaining open. T1 and P1 are the initial temperature and pressure of the working fluid. The exhaust port is closed and the working fluid is then adiabatically compressed by the piston from state 1 to state 2, where cylinder volume V2 is the volume of the cylinder with the piston at top dead center (TDC). V2 is also the combustion volume. The working fluid is pressurized to P2. A compression ratio $r_c$ is thus defined as V1/V2. The adiabatically compressed air-fuel mixture has also acquired a temperature of T2 during compression. For an ideal gas, $$T2 = T1(V1/V2)^{\gamma-1} \text{ or } T2 = T1 r_c^{\gamma-1}$$

where $\gamma = C_p/C_v$, the ratio of the heat capacities of the working fluid. Heated hydrogen gas is injected at constant volume V2, boosting the pressure from P2 to P2'. Subsequently, water vapor is injected at constant volume V2, boosting the pressure from P2' to P2". The mixture is then spark-ignited causing a sudden change of state from state 2" to state 3 at constant volume V2. The pressure rises from P2" to P3, and the temperature (not shown) rises to T3. The burned exhaust gases then undergo an isentropic expansion launching the power stroke, where the exhaust gases push the piston toward BDC and cool by the adiabatic expansion. The cylinder volume returns to volume to V0 at state 4, where the piston is at BDC once again. The exhaust gases have cooled during expansion to temperature T4. At this point the intake and exhaust valves open and air is scavenged and cryogenically cooled, bringing the pressure from P4 to P1 (and temperature T1). The area closed by the curve is thus the maximum theoretical pressure-volume (PV) work extractable from the engine. From first law considerations, the maximum theoretical PV work is calculated by $$W_c = \int_c P dV = W_E - W_C \quad (2)$$

where $W_c$ is the net extractable work per cycle; $W_C$ being the compression work and $W_E$ being the expansion work.

For purposes of comparison, an idealized two-stroke Otto cycle (broken curve) is superimposed on the idealized inventive engine cycle in FIG. 5. Geometrically the compression ratio is smaller in the Otto cycle than it is for the inventive engine, as a result of the shorter cylinders in a typical crank-driven Otto engine. Besides the geometrical constraints on the stroke length, the Otto engine compression ratio is primarily restricted by the autoignition temperature of gasoline fuel. For Diesel engines, high compression ratios are encouraged to induce autoignition, but stroke length is still limited by engine geometry, therefore necessitating a very small combustion volume V2. It is also shown in FIG. 5 that the combustion volume is also significantly smaller in a conventional Otto engine. The pressure of the compressed working fluid P2 for the inventive engine is lower than the corresponding pressure in the Otto cycle engine because of the cooling of the working fluid, and the fact that the scavenged working fluid ambient pressure P1 is significantly lower than the corresponding pressure for an Otto cycle engine operating at high altitude, requiring inducted turbocharged air. Injection of gaseous hydrogen and water vapor boost the pressure from P2 to P2", which may cause the pressure of the mixture in the combustion volume (V2) to substantially match that in an Otto engine, however any work that may be involved in the injection of gaseous hydrogen and water vapor in the inventive engine is not subtracted from the theoretical total work of the engine because this is done at constant volume. Finally, the peak combustion pressure P3 is higher in the inventive engine than in a typical Otto cycle engine because of judicious temperature management, a feature of the inventive engine. These modifications will expand the area contained by the closed curve representing the inventive engine cycle relative to a typical Otto engine. The truncation of the PV curve in an Otto cycle at BDC is due to the design and operation of the engine, where the piston arrives at BDC while the exhaust gases are hot and at a relatively high pressure, only to be relieved by the opening of the exhaust port. The remaining unspent energy contained in the exhaust gases is thus wasted by heating the exhaust manifold. Contrastingly, the inventive engine captures all the energy of combustion by allowing the expansion to go as far as it can without imposing artificial mechanical restraints. From first law thermodynamic considerations, one can derive a thermal efficiency of any engine cycle:

$$\eta = W_c/m_f Q_{LHV} \qquad (3)$$

where $Q_{LHV}$ is the lower heating value of the fuel per unit mass, which is the total energy contained in the fuel assuming 100% combustion at 293K, and $m_f$ is the mass of fuel.

From further first law analysis of equation (3), the engine thermal efficiency h can be derived for an air-standard (ideal) Otto cycle in terms of the compression ratio $r_c$ and $\gamma$:

$$\eta = 1 - r_c^{(1-\gamma)} \qquad (4)$$

where again $\gamma$ is the ratio of the molar heat capacities $C_p/C_v$, where $C_p = C_v + R$, R being the universal gas constant. Equation (4) serves to point out two parameters that have great importance in engine thermal efficiency, namely the compression ratio $r_C$ and $\gamma$. A reduction in magnitude of either of these parameters will result in a decrease of $\eta$. While equation (4) applies to an ideal Otto cycle, in a general sense, this principle can be applied to most constant volume engine cycles. More specifically, the inventive engine cycle can be considered a modified Atkinson cycle where the expansion ratio is greater than the compression ratio, thus its efficiency can be accurately approximated by the ideal air-standard analysis result for Atkinson cycle efficiency:

$$\eta = 1 - \gamma(r_e - r_c)/(r_e^\gamma - r_c^\gamma) \qquad (5)$$

where $r_e$ is the expansion ratio.

Constraints of $\gamma$

As $1-\gamma$ is the exponent to which $r_C$ is raised, it is clear from equation (4) that the thermal efficiency $\eta$ is a sensitive function of $\gamma$, and increases accordingly. Thus maintaining a high value for $\gamma$ is imperative to gaining high engine efficiency. This point is not emphasized enough in the art. The maximum value that $\gamma$ can attain is 5/3 (1.67) for an ideal monatomic gas, and then decreases for diatomic ($\gamma=1.4$) and polyatomic molecules. From a phenomenological viewpoint, the decrease in $\gamma$ stems from increases in the value of temperature-dependent heat capacities in diatomic and polyatomic molecules compared to monatomic gases. $\gamma$ will asymptotically approach unity from a maximum of 1.67 with increasing $C_v$ (note that when $\gamma \rightarrow 1$, $\eta \rightarrow 0$). From statistical mechanical considerations, this increase in heat capacity $C_v$ in polyatomic molecules is a consequence of the partition of energy of rotational and vibrational states at high temperatures, in addition to the three translational degrees of freedom, the latter being the only states accessible to monatomic gases. Heat capacities of polyatomic molecules have contributions from the translational, rotational and vibrational degrees of freedom. Excited vibrational states are accessed by internal molecular energy transfer mechanisms at higher temperatures and are additional channels for energy storage in polyatomics. For a diatomic molecule, the vibrational contribution to Cv is:

$$C_{v,v} = k_B (\Theta_v/T)^2 \{\exp(\Theta_v/T)/(\exp(\Theta_v/T)-1)^2\} \qquad (5)$$

where $C_{v,v}$ is the vibrational heat capacity (constant volume). $\Theta_r$ and $\Theta_v$ are the rotational and vibrational temperature equivalences to the quantum state energies for the first excited states, respectively ($\Theta_v \gg \Theta_r$). At high temperatures where $T \sim \Theta_v$, vibrational modes are accessible to diatomic and larger molecules, therefore become populated, causing the heat capacity of the molecule to increase due to partitioning of energy into more states. Rotational and vibrational temperatures for first excited rotational and vibrational quantum states for $N_2$, $O_2$, $H_2$ and $H_2O$ are tabulated in the table below.

TABLE I

| Rotational and vibrational temperatures | | |
|---|---|---|
| molecule | $\Theta_r$(K) | $\Theta_v$(K) |
| $N_2$ | 2.88 | 3374 |
| $O_2$ | 2.07 | 2256 |
| $H_2$ | 85.3 | 6215 |
| $H_2O$ | 40.1, 20.9, 13.4 | 5360, 5160, 2290 |

As can be seen from the above table, the vibrational contribution to the heat capacity is initiated at high temperatures; the rotational state contribution is already saturated at normal temperatures. Therefore, at $T = \Theta_v$, $C_{v,v} = 0.93 \, k_B \approx k_B$; thus $$C_v = 3/2 + 2 = 7/2 k_B 7/2R \text{ for a diatomic;} \qquad (7)$$

$$\gamma = C_p/C_v \rightarrow 1.29 \text{(vs. } \sim 1.4 \text{ at } 25° \text{ C.) as } T \rightarrow \Theta_v \text{ for a diatomic} \qquad (8)$$

In an engine cylinder, temperatures of $\Theta_v/3$, which would correspond to 934K and 1306K for oxygen and nitrogen, respectively, and easily exceeded in a typical engine cylinder, would already lower $\gamma$ to 1.33 for each of these gases. The reduction of $\gamma$ by subjecting the exhaust gases to high temperatures whereby Q is partitioned into molecular vibrational states is known as partition loss. For instance, water, a triatomic molecule, would contribute significantly to the partition losses since it has a low energy vibrational mode ($\Theta_v = 2290K$), which can be accessed even at relatively low temperatures, which result in the reduction of $\gamma$. Indeed the phenomenological dependence of the molar heat capacities of gases on temperature is well known, however the deleterious effect of high combustion temperatures on engine efficiency is not widely acknowledged. Those skilled in the art will therefore appreciate that Carnot efficiency considerations cannot be applied to internal combustion engines due to this temperature dependence of the molar heat capacity.

It is therefore imperative in the design of high efficiency engines to provide a means of temperature management in order to limit combustion chamber temperatures. As the temperature in the cylinder rises during combustion, a greater portion of the energy of combustion Q that is absorbed by the diatomic and polyatomic species present in the cylinder will be partitioned into vibrational modes and not available to increase molecular translational energy that manifests as pressure on the piston. The energy stored in the vibrational modes is subtracted from the total energy Q, and the amount of PV work extractable from Q, until it is returned from those modes as the gases cool.

In standard crank-driven SI engine design, combustion temperature management is virtually non-existent. The piston dwells at TDC because of the lateral motion of the piston rod at low crank angles. Ignition is generally advanced by 10 to 40 degrees of TDC to compensate for the slow flame speed of typical hydrocarbon fuels, beginning before the compression stroke terminates. Adiabatic expansion cooling of the hot exhaust gases is retarded for a significant portion of the crank rotation after TDC. During the dwell period at TDC, the hot exhaust gases lose significant amounts of combustion energy through the cylinder walls as heat in the small combustion volume. Typically the combustion volume in a standard SI engine design has a high surface-to-volume (A/V) ratio due to small clearance distances in the combustion volume space, thus exposing the hot exhaust gases to a great deal of conductive surface area. Moreover, when the piston finally does begin the expansion stroke, gases continue to burn for up to 40 crank degrees after TDC or more, many times with the piston outrunning the flame front. This is sometimes known as timing loss, and manifests as decreased peak pressure but increased cylinder pressure during expansion (compared to the fuel-air cycle) because of the persistence of high exhaust gas temperatures throughout the expansion phase of the cycle. As gases expand, continued combustion adds more heat at lower expansion ratios, and cylinder temperatures and pressures remain high because less work is extracted since the volumetric changes are smaller. Persistence of high temperatures suppress the channeling of vibrational energy into kinetic energy, resulting high heat transfer losses to the cylinder walls instead of extraction as pressure volume work, hence a significant portion of the available combustion energy Q is thus permanently lost. In effect, there is a reduced conversion of combustion energy to work occurring at lower effective compression ratios. The overall effect is a drastic reduction in the thermal efficiency η.

Constraints of $r_c$

It is well known in the art that engine efficiency increases with increasing compression ratio (see equations 4 and 5), However, compression ratio in conventional SI gasoline engine operation is limited by the autoignition temperature of the fuel, which places an upper limit on the pre-ignition temperature of the cylinder T2. In conventional SI engines, two factors come into play. First, the piston stroke length is confined by the length of the piston rod and the crank shaft offset, both determined in part by the size of the engine block, limiting the total cylinder displacement. Typically, compression ratios for spark-ignited engines in passenger automobiles range from 8 to 15, with 10 being common.

It is recognized that the temperature-displacement volume (T-V) profile for adiabatic expansion exhibits an exponential decay of temperature that becomes increasingly steep as the compression ratio is raised. This steep decay portion of the T-V curve defines a high temperature transition that for purposes of illustration portends the decay to half of the maximum temperature T3, not exceeding 2300K in the preferred embodiment, as exhaust gases expand from TDC. Barring delayed combustion, a particular advantage of designing a SI engine to have a high compression ratio is that the steepness of the decay, as a function of the compression ratio, increases with increasing compression ratio, allowing the passage through the high temperature transition to occur earlier in the expansion stroke. Thus combustion energy Q is returned from vibrational modes to manifest as kinetic energy that is converted to pressure-volume work early in the stroke, where the cylinder volume is still small and the effective compression ratio is still high. This is in contrast to an engine designed to function at low compression. As well, energy is returned to the working fluid by completing combustion early in the expansion stroke as temperatures drop precipitously, where thereafter water dissociation is suppressed at lower cylinder temperatures. Put another way, a proportionately longer portion of the stroke is driven by expanding exhaust gases that remain below critical temperatures when the compression ratio is increased, maximizing conversion of Q into pressure-volume work, and therefore maximizing thermal efficiency.

The preferred embodiment of the present invention therefore provides for extraordinarily high compression ratios and hence extraordinarily long expansion stroke lengths, and of equal importance, high piston acceleration rates from TDC so that the high temperature transition occurs on a time scale that is too short for heat transfer losses to become significant. An extraordinarily long expansion stroke results from the extraordinarily large compression ratios of 60:1 or greater that are provided by the inventive engine, with fixed and large combustion volume at TDC resulting in clearance distances of 0.75 inches (1.9 cm) or more, combined with over expansion to BDC. In the preferred embodiment, the expansion stroke length is therefore at least 45 inches (115 cm). The expansion stroke comprises the length of the cylinder from TDC to BDC. Also in the preferred embodiment, the expansion stroke length exceeds the compression stroke length, as the expansion ratio is larger than the compression ratio.

Advantageously, the provision of a long and rapid expansion stroke by the present invention yields the following consequences: 1) the greatest amount of combustion energy Q released at constant volume is converted to pressure-volume work within an increasingly smaller initial portion of piston displacement, while an increasingly greater portion of the piston displacement (travel) occurs at lower temperatures where the maximum amount of Q is available for extraction to P-V work, and 2) heat transfer losses are reduced to near-zero due to the high acceleration of the piston from the TDC position. The end result translates to high thermal efficiencies.

Effect of Temperature on Combustion Efficiency

It is recognized that hydrogen combustion has a large negative equilibrium temperature dependence, and endothermic water dissociation (reverse of combustion) becomes more significant with increasing temperature above 2000K, particularly above 3000K. At these high temperatures the principle combustion product that is water undergoes dissociation to hydrogen and oxygen, an endothermic reaction that consumes energy released during combustion. As a consequence, the extent of combustion is diminished and therefore less heat of combustion Q is available for conversion to pressure volume work, because a portion of the available energy is channeled into the endothermic reaction of water dissociation. The equilibrium constant of hydrogen combustion has a high negative dependence on temperature as expressed by:

$$K = 0.0835 T^{-1.3565} \exp(58171/T)$$

(Norbert Peters, Institute for Combustion Technology, DLR, Stuttgart).

The equilibrium mass fraction distribution of reactants and products at different temperatures is shown in the table below to indicate the extent of dissociation at higher combustion temperatures.

| T [K] | p [bar] | $Y_{H_2}$ | $Y_{O_2}$ | $Y_{H_2O}$ |
|---|---|---|---|---|
| 2000 | 1 | 0.0006 | 0.0049 | 0.9945 |
| 3000 | 1 | 0.0172 | 0.1364 | 0.8464 |
| 4000 | 1 | 0.0653 | 0.5180 | 0.4167 |
| 2000 | 10 | 0.0002 | 0.0022 | 0.9974 |
| 3000 | 10 | 0.0084 | 0.0664 | 0.9252 |
| 4000 | 10 | 0.0394 | 0.3127 | 0.6478 | source: Norbert Peters, Princeton Lecture #2 (2010).

The invention claimed is:

1. A method for operating an opposed-piston internal combustion engine cycle for enabling highly efficient stratospheric flight, comprising:

(i) Providing an internal combustion engine in operation having a plurality of cylinders disposed symmetrically about a main shaft, each cylinder enclosing a pair of first and second opposed pistons, each of said pistons connected to a piston rod, wherein each piston translates back and forth along the long axis of the cylinder and wherein the combined motion of the piston pair is synchronized to allow the cyclical translation of the first piston to be in phase with that of the second piston, whereby each piston reaches their respective top dead center and bottom center positions at substantially the same time, and whereby the volume of the cylinder is defined by the product of the distance between the top surfaces of the first and second pistons and the cross sectional area of the cylinder, the maximal volume $V0$ defined where the distance between the top surfaces of the first and second pistons is the largest in the engine cycle, the first and second pistons being at the bottom dead center position, an intermediate volume $V1$ defined where the compression stroke of the piston pair begins, $V1<V0$, and the minimal volume $V2$, $V2<V1$, defined where the distance between the top surfaces of the first and second pistons is the smallest in the engine cycle and being the terminal volume of the compression stroke and the beginning volume of the expansion stroke, the first and second pistons being at the top dead center position, and each cylinder in the plurality of cylinders having at least one intake port extending through the opposed cylinder wall and disposed near the bottom dead center positions of each piston pair, and at least one exhaust port extending through the opposed cylinder wall and disposed near the top dead center positions of each piston pair, the intake and exhaust ports allowing gaseous communication between the internal volume of the cylinders and the external environment of the cylinders;

(ii) Providing a gaseous working fluid having a temperature $T1$ at or below ambient temperature and pressure $P1$ substantially at ambient pressure, to an engine compartment housing the engine;

(iii) Opening one or more exhaust ports disposed in the wall of each cylinder substantially near the end of the expansion phase of the previous engine cycle wherein the volume of the cylinder is substantially near $V0$ and the pressure of the exhaust gases within the cylinder $P4$ is greater than the gaseous working fluid pressure $P1$ on the exterior of the cylinder wall, and whereby the exhaust gases expand and exit through said open exhaust ports, and wherein $V0$ is the volume at which the pistons are at the bottom dead center position;

(iv) Opening one or more intake ports disposed in the wall of each cylinder in succession to the opening of the one or more exhaust ports, whereby exhaust gases from the previous engine cycle are purged from the cylinder by means of a flow created by a pressure differential between the open intake and exhaust ports, and working fluid flows at ambient pressure into the cylinder through the open intake ports;

(v) Closing the open exhaust ports and returning the cylinder volume to $V1$ from $V0$ by engaging the pistons in a partial compression stroke, wherein the working fluid is maintained at a constant pressure by means of the open exhaust ports;

(vi) Closing the open intake ports and compressing the working fluid in the cylinders, by moving the pistons towards top dead center from cylinder volume $V1$ to a final volume $V2$, whereby $V2$ is substantially less than $V1$ and the compression ratio $V1/V2$ is 50:1 or greater, and wherein the volume $V2$ defines a combustion volume residing between the top surfaces of the pistons when both opposed pistons are at the top dead center position, whereby the value of $V2$ is such that the heat transfer surface area to volume ratio $A/V2$, wherein $A$ is the total heat transfer surface area, comprising the intervening cylinder wall surface defined by the cylinder bore diameter and the distance between the insulated top surfaces of the opposed pistons, to volume $V2$, is at an optimal value in order to minimize combustion energy losses resulting from convective and conductive heat transfer to said wall surface;

(vii) Metering a fuel charge of liquid hydrogen into the combustion volume $V2$ wherein the fuel charge is measured to maintain an equivalence ratio phi between 0.4 and 1.0;

(viii) Metering a charge of water vapor into the combustion volume $V2$ to provide a fluid means of partially absorbing the heat released from combustion of the fuel;

(ix) Combusting the fuel charge in the combustion volume $V2$ by spark ignition wherein the pistons are substantially stationary at the top dead center position for the duration of the combustion process and whereby spark formation and ensuing combustion is uniform in the cross section of $V2$;

(x) Expanding the cylinder volume from $V2$ to $V0$ at a high initial velocity, wherein the pistons are propelled freely by the forces derived from the instantaneous pressure of the exhaust gases, from the top dead center position at $V2$ toward the bottom center position at $V0$ without mechanical constraint for an initial portion of the expansion stroke before mechanically engaging a coupling mechanism converting linear motion to rotational motion; and (xi) Coupling the pistons to a cylindrical end-cam for imparting rotation thereto, whereby the cylindrical end-cam comprises a central axis and a cam profile having a compression segment setting the length of the compression stroke, the compression segment followed by a dwell segment setting the dwell time of the pistons at top dead center, the dwell segment followed by a power drive segment setting the length of the expansion stroke, said power drive segment having a first portion and a second portion that is contiguous with said first portion, wherein the first portion of the power drive segment is substantially parallel to the central axis of the cylindrical end-cam to provide for rapid piston acceleration in a first portion of the expansion stroke, and the second portion of the power drive segment possessing a curvature whereby the slope of the power drive segment smoothly transitions from being substantially parallel to the central axis of the cylindrical end-cam to being substantially perpendicular to the central axis to gradually engage the piston force for converting the linear piston motion to rotary motion of the engine in a second portion of the expansion stroke, said power drive segment and said compression segment configured such that the expansion stroke length of the piston is longer than the compression stroke length of the piston.

2. The method of claim 1, wherein the gaseous working fluid is selected from the group consisting of cryogenically cooled air, argon and xenon.

3. The method of claim 1, wherein the uniform spark formation is generated by a spark matrix disposed in the combustion volume $V2$ between each piston when said pistons are at TDC.

4. A spark matrix comprising:
(i) A plurality of insulating tubes having two ends, each insulating tube having a plurality of hole pairs disposed along the length of each tube, the holes penetrating the tubular wall; and
(ii) Wire tips protruding through said holes such that adjacent wire tip pairs protruding through a hole pair having a first hole and a second hole are bent towards each other, forming a gap between the pair of wire tips, said gap comprising a spark generation node, each individual wire of a wire tip pair extending to the adjacent hole pair and protruding through the fist hole, forming a spark generation node with the wire tip protruding through the second hole, and each spark generation node along an individual tube being electrically connected in series, whereby the terminal wires extending from the ends of each individual tube are each electrically connected to a high voltage source of opposite polarity.

5. A mechanical coupling system for coupling linear piston motion to rotary motion of an engine shaft, comprising:
(i) A reciprocating piston disposed inside a cylinder of an opposed-piston engine, said piston affixed to a first end of a piston rod;
(ii) A cylindrical end-cam, wherein the end-cam comprises a central axis and a cam profile having a compression segment setting the length of the compression stoke, the compression segment followed by a dwell segment setting the dwell time of the pistons at top dead center, the dwell segment followed by a power drive segment setting the length of the expansion stroke, said power drive segment having a first portion and a second portion that is contiguous with said first portion, wherein the first portion of the power drive segment is substantially parallel to the central axis of the cylindrical end-cam to provide for rapid piston acceleration in a first portion of the expansion stroke, and the second portion of the power drive segment possessing a curvature whereby the slope of the power drive segment smoothly transitions from being substantially parallel to the central axis of the cylindrical end-cam to being substantially perpendicular to the central axis to gradually engage the piston force for converting the linear piston motion to rotary motion of the engine in a second portion of the expansion stroke, said power drive segment and said compression segment configured such that the expansion stroke length of the piston is longer than the compression stroke length of the piston; and
(iii) A rotatable wheel cam follower disposed at a second end of the piston rod, whereby said wheel cam follower is engaged with the rim of the rotary end-cam in such a way that the cam follower rides along said rim by a rolling engagement, thereby following the end-cam profile as said end-cam rotates about its main axis, the cam follower thereby coupling the linear motion of the piston to drive the rotary motion of the cylindrical end-cam, whereby the axial force of the piston is exerted on the power segment of the cam profile during the expansion stroke, the degree of conversion of axial force to lateral force dependent on the profile angle of the power segment with respect to the main axis of the end-cam, and conversely the rotary motion of the end-cam is converted to linear motion of the piston when said cam follower is in mechanical contact with the pre-compression and compression segments of the cam profile.

6. The power drive segment of claim 5, wherein the profile of the power drive segment approximates a log(x) function.

\* \* \* \* \*